(12) United States Patent
Ghatti et al.

(10) Patent No.: US 11,333,236 B2
(45) Date of Patent: May 17, 2022

(54) DRIVETRAIN SYSTEM HAVING AN AXLE ASSEMBLY

(71) Applicant: ArvinMeritor Technology, LLC, Troy, MI (US)

(72) Inventors: Chetankumar Ghatti, Troy, MI (US); Rodrigo Soffner, Osasco (BR); Mark Smith, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 374 days.

(21) Appl. No.: 16/692,012

(22) Filed: Nov. 22, 2019

(65) Prior Publication Data

US 2021/0156464 A1    May 27, 2021

(51) Int. Cl.
| F16H 57/00 | (2012.01) |
| F16H 48/36 | (2012.01) |
| F16H 57/02 | (2012.01) |
| F16H 63/30 | (2006.01) |

(52) U.S. Cl.
CPC ..... F16H 57/0037 (2013.01); F16H 57/0025 (2013.01); F16H 2048/364 (2013.01); F16H 2057/02034 (2013.01); F16H 2063/3073 (2013.01)

(58) Field of Classification Search
None
See application file for complete search history.

(56) References Cited

U.S. PATENT DOCUMENTS

| 8,858,379 | B2 | 10/2014 | Keeney et al. | |
| 10,500,941 | B2* | 12/2019 | Garcia | B60K 17/165 |
| 11,034,237 | B2* | 6/2021 | Hirao | F16H 59/041 |
| 11,124,054 | B1* | 9/2021 | Hadad | F16H 3/44 |
| 2011/0098151 | A1* | 4/2011 | Ziemer | B60K 6/485 |
| | | | | 477/20 |
| 2019/0054816 | A1 | 2/2019 | Garcia et al. | |
| 2019/0054817 | A1 | 2/2019 | Garcia et al. | |
| 2019/0054818 | A1 | 2/2019 | Garcia et al. | |
| 2019/0366838 | A1* | 12/2019 | Hirao | F16D 11/10 |
| 2020/0247236 | A1* | 8/2020 | Hirao | F16D 11/10 |

FOREIGN PATENT DOCUMENTS

| CN | 109435671 A | 3/2019 |
| DE | 10 2016 220511 A1 | 4/2018 |

OTHER PUBLICATIONS

Extended European Search Report dated Apr. 9, 2021 for related European Appln. No. 20208750.8; 15 Pages.
Dhanapal, et al., U.S. Appl. No. 16/205,586, filed Nov. 30, 2018.
Smith, et al., U.S. Appl. No. 16/205,623, filed Nov. 30, 2018.
Smith, et al., U.S. Appl. No. 16/206,182, filed Nov. 30, 2018.
Soffner, et al., U.S. Appl. No. 16/205,663, filed Nov. 30, 2018.
Begov et al., U.S. Appl. No. 16/205,717, filed Nov. 30, 2018.
Smith, et al., U.S. Appl. No. 16/205,771, filed Nov. 30, 2018.
Peng, et al., U.S. Appl. No. 16/205,850, filed Nov. 30, 2018.

\* cited by examiner

*Primary Examiner* — Dirk Wright

(74) *Attorney, Agent, or Firm* — Brooks Kushman PC

(57) ABSTRACT

A drivetrain system including an axle assembly that may have an electric motor module, a gear reduction module, a drive pinion, a differential assembly, an auxiliary shaft, and a shift collar. The shift collar may selectively couple the auxiliary shaft, the drive pinion, and the gear reduction module in various combinations.

20 Claims, 19 Drawing Sheets

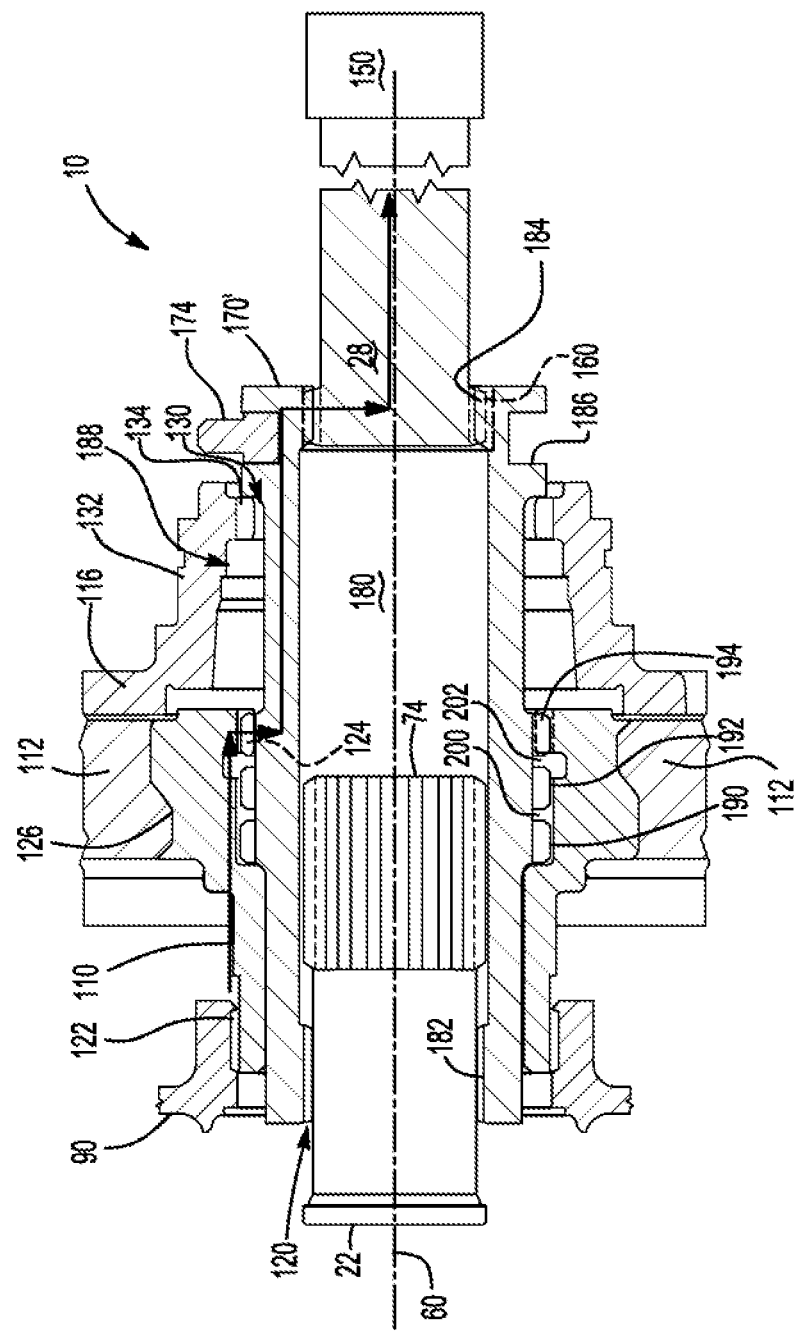

DRIVETRAIN SYSTEM HAVING AN AXLE ASSEMBLY

TECHNICAL FIELD

This disclosure relates to a drivetrain system that may include an axle assembly. The axle assembly may include an electric motor module, a gear reduction module, a drive pinion, a differential assembly, an auxiliary shaft, and a shift collar. The shift collar may selectively couple the auxiliary shaft, the drive pinion, and the gear reduction module in various combinations.

BACKGROUND

An axle assembly having an electric motor module is disclosed in U.S. Patent Publication No. 2019/0054816.

SUMMARY

In at least one embodiment, a drivetrain system is provided. The drivetrain system may include an axle assembly that has an electric motor module, a gear reduction module, a drive pinion, a differential assembly, an auxiliary shaft, and a shift collar. The gear reduction module may be operatively connected to the electric motor module. The drive pinion may be rotatable about a first axis. The differential assembly may be rotatable about a second axis and may engage the drive pinion. The auxiliary shaft may be rotatable about the first axis and may be spaced apart from the drive pinion. The shift collar may be rotatable about the first axis with the auxiliary shaft and may selectively couple the auxiliary shaft to the drive pinion, the gear reduction module, or the drive pinion and the gear reduction module.

In at least one embodiment, a drivetrain system is provided. The drivetrain system may include an axle assembly that has an electric motor module, a gear reduction module, a drive pinion, a differential assembly, an auxiliary shaft, and a shift collar. The gear reduction module may be operatively connected to the electric motor module. The drive pinion may be rotatable about a first axis. The differential assembly may be rotatable about a second axis and may engage the drive pinion. The auxiliary shaft may be rotatable about the first axis and may be spaced apart from the drive pinion. The shift collar may be rotatable about the first axis and may be configured to selectively couple the gear reduction module to the auxiliary shaft or the drive pinion.

BRIEF DESCRIPTION OF THE DRAWINGS

FIGS. 15-19 show the shift collar in a first neutral position, low range position, a high range position, a second neutral position, and an auxiliary drive position, respectively, and associated torque flow paths.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
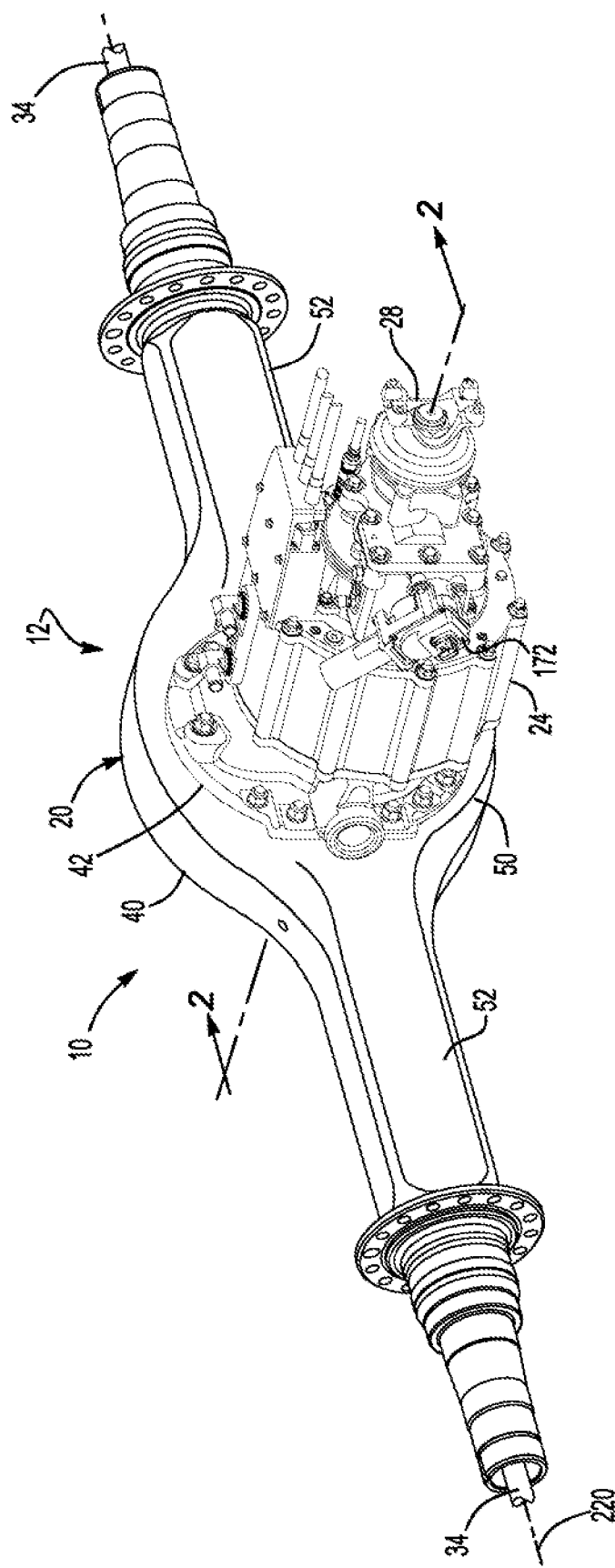
FIG. 1 is a perspective view of a portion of a drivetrain system including an axle assembly.

Referring to FIG. 1, an example of a drivetrain system 10 is shown. The drivetrain system 10 may include an axle assembly 12. The axle assembly 12 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments. The axle assembly 12 may provide torque to one or more traction wheel assemblies that may include a tire mounted on a wheel. The wheel may be mounted to a wheel hub that may be rotatable about an axis.

One or more axle assemblies may be provided with the vehicle. As is best shown with reference to FIGS. 1 and 2, the axle assembly 12 may include a housing assembly 20, a drive pinion 22, an electric motor module 24, a gear reduction module 26, an auxiliary shaft 28, a shift mechanism 30, a differential assembly 32, and at least one axle shaft 34.

Referring to FIG. 1, the housing assembly 20 may receive various components of the axle assembly 12. In addition, the housing assembly 20 may facilitate mounting of the axle assembly 12 to the vehicle. In at least one configuration, the housing assembly 20 may include an axle housing 40 and a differential carrier 42. In addition, the housing assembly 20 may include portions that may receive and/or facilitate mounting of the electric motor module 24, the shift mechanism 30, or both.

The axle housing 40 may receive and may support the axle shafts 34. In at least one embodiment, the axle housing 40 may include a center portion 50 and at least one arm portion 52.

The center portion 50 may be disposed proximate the center of the axle housing 40. The center portion 50 may define a cavity that may receive the differential assembly 32. A lower region of the center portion 50 may at least partially define a sump portion that may contain a first lubricant. Splashed lubricant may flow down the sides of the center portion 50 and may flow over various internal components of the axle assembly 12 and gather in the sump portion.

One or more arm portions 52 may extend from the center portion 50. For example, two arm portions 52 may extend in opposite directions from the center portion 50 and away from the differential assembly 32. The arm portions 52 may have substantially similar configurations. For example, the arm portions 52 may each have a hollow configuration or tubular configuration that may extend around and may receive a corresponding axle shaft 34 and may help separate or isolate the axle shaft 34 or a portion thereof from the surrounding environment. An arm portion 52 or a portion thereof may be integrally formed with the center portion 50. Alternatively, an arm portion 52 may be separate from the center portion 50. In such a configuration, each arm portion 52 may be attached to the center portion 50 in any suitable manner, such as by welding or with one or more fasteners. An arm portion may rotatably support an associated wheel hub. It is also contemplated that the arm portions 52 may be omitted.

Figure 2:
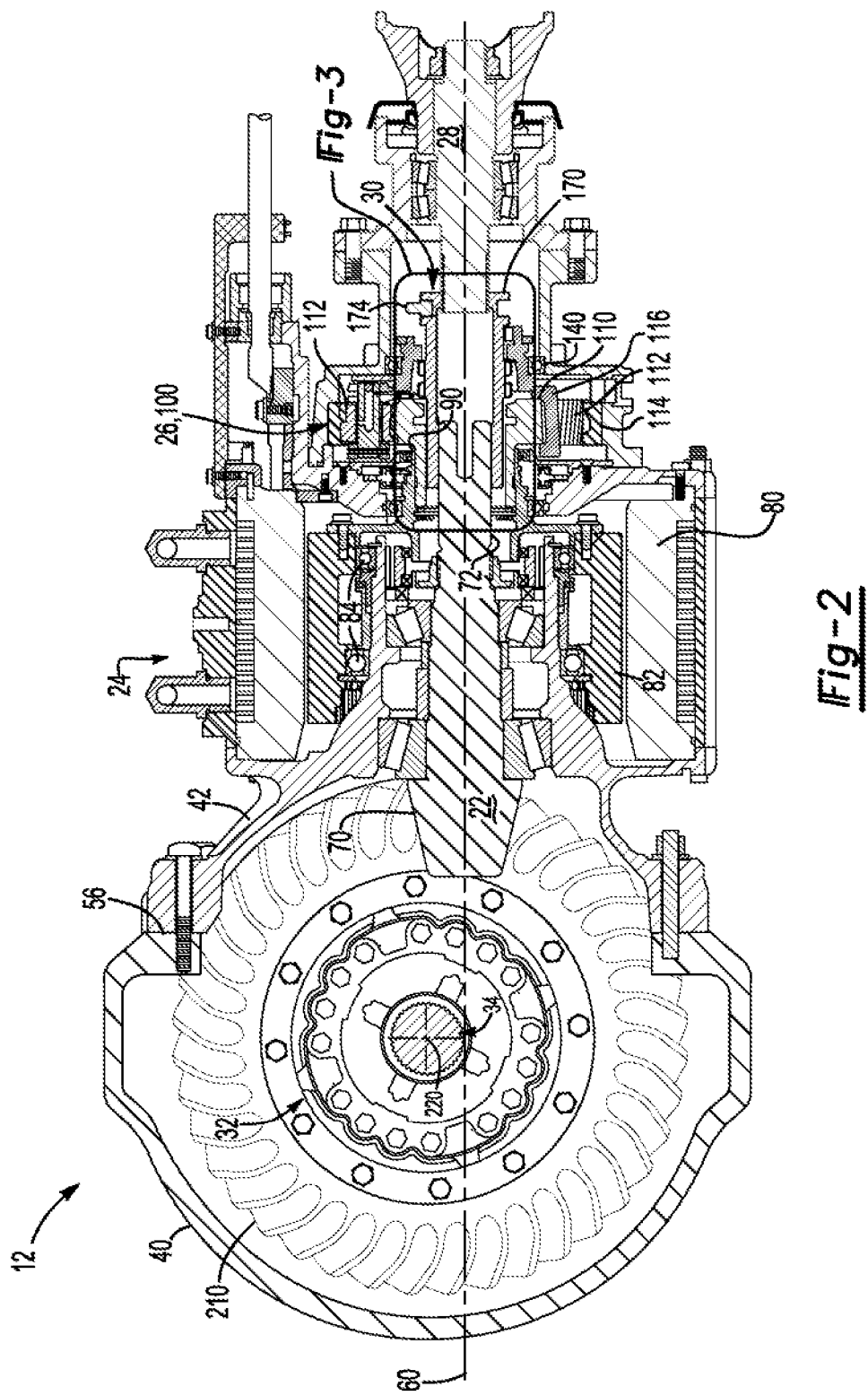
FIG. 2 is a section view of the axle assembly along section line 2-2.

Referring to FIGS. 1 and 2, the differential carrier 42, which may also be called a carrier housing, may be mounted to the center portion 50 of the axle housing 40. The differential carrier 42 may support the differential assembly 32. In at least one configuration, the differential carrier 42 may facilitate mounting of the electric motor module 24.

Referring to FIG. 2, the drive pinion 22 may provide torque to a ring gear that may be provided with the differential assembly 32. Moreover, the drive pinion 22 may help operatively connect the gear reduction module 26 to the differential assembly 32. The drive pinion 22 may extend along and may be rotatable about a first axis 60. In addition, the drive pinion 22 may extend through a hole in the differential carrier 42. In at least one configuration, the drive pinion 22 may include a gear portion 70 and a shaft portion 72.

The gear portion 70 may be disposed at or near an end of the shaft portion 72. The gear portion 70 may have a plurality of teeth that may mate or mesh with corresponding teeth on the ring gear. The gear portion 70 may be integrally formed with the shaft portion 72 or may be provided as a separate component that may be fixedly disposed on the shall portion 72.

The shaft portion 72 may extend from the gear portion 70 in a direction that extends away from the axle housing 40. The shaft portion 72 may be rotatably supported by one or more drive pinion bearings and may include a drive pinion spline 74, which is best shown in FIG. 3.

Figure 3:
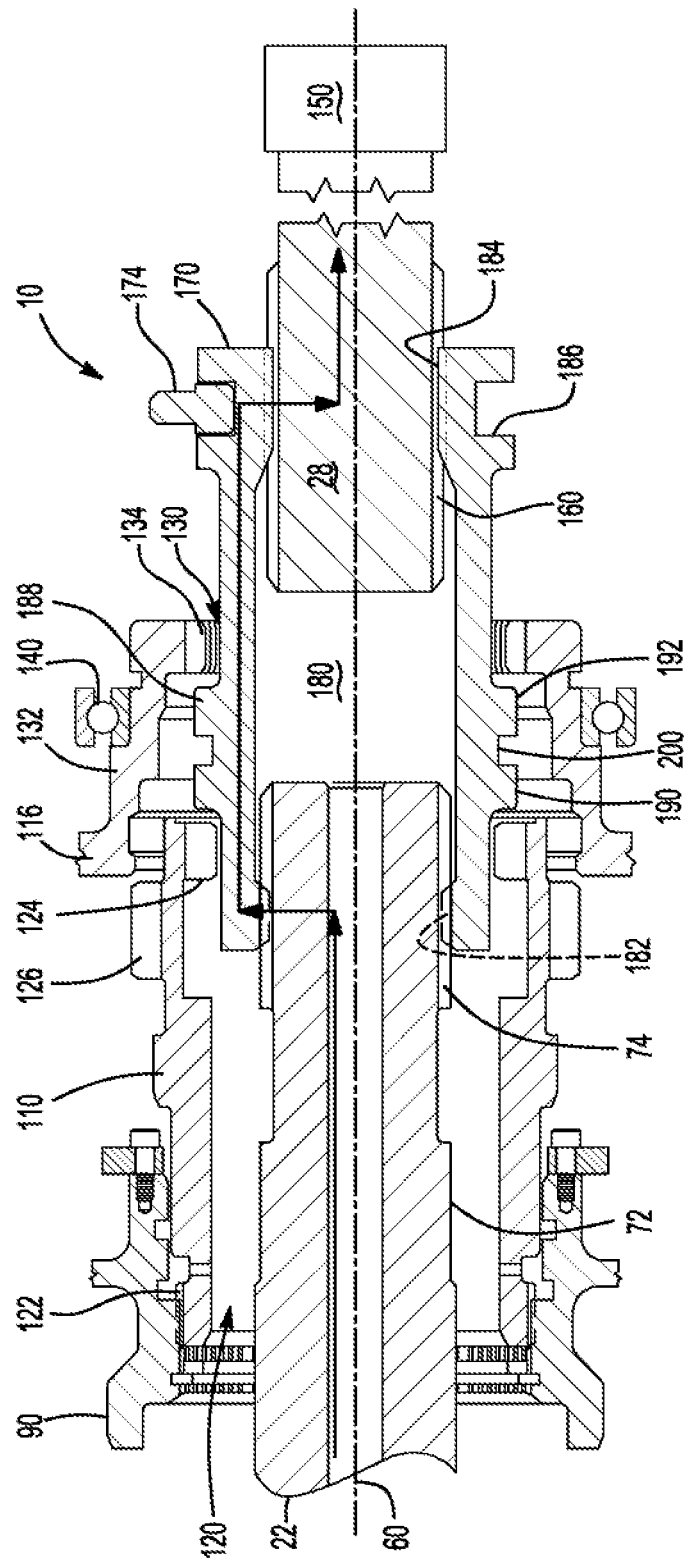
FIGS. 3-6 show the shift collar in first, second, third, and fourth positions, respectively, and torque flow paths associated with a power take off (PTO) configuration.

Referring to FIG. 3, the drive pinion spline 74 may be disposed near an end of the shaft portion 72 that may be disposed opposite the gear portion 70. The drive pinion spline 74 may include a plurality of teeth. The teeth may be disposed substantially parallel to the first axis 60 and may mate with a corresponding spline on a shift collar of the shift mechanism 30 as will be discussed in more detail below.

Referring to FIG. 2, the electric motor module 24 may provide torque to the differential assembly 32 via the drive pinion 22, the gear reduction module 26, and the shift mechanism 30. In at least one configuration, the electric motor module 24 may be mounted to the differential carrier 42 and may be axially positioned between the axle housing 40 and the gear reduction module 26. In at least one configuration, the electric motor module 24 may include a stator 80, a rotor 82, and at least one rotor bearing assembly 84.

The stator 80 may be fixedly positioned with respect to the housing assembly 20. For example, the stator 80 may extend around the first axis 60 and may not rotate about the first axis 60. The stator 80 may include windings that may be electrically connected to an electrical power source, such as a battery, capacitor, or the like. An inverter may electrically connect the electric motor module 24 and the electrical power source.

The rotor 82 may be rotatable about the first axis 60 with respect to the differential carrier 42 and the stator 80. For example, the rotor 82 may be spaced apart from the stator 80 but may be disposed close to the stator 80. The rotor 82 may include magnets or ferromagnetic material that may facilitate the generation of electrical current.

One or more rotor bearing assemblies 84 may rotatably support the rotor 82. In at least one configuration, a rotor bearing assembly 84 may receive a bearing support wall of the differential carrier 42 and may be received inside of the rotor 82.

A rotor shaft 90 or rotor coupling may operatively connect the rotor 82 to the gear reduction module 26. For example, the rotor shaft 90 may extend from the rotor 82 or may be operatively connected to the rotor 82 such that the rotor 82 and the rotor shaft 90 may be rotatable together about the first axis 60. The rotor shaft 90 may be fixedly coupled to the rotor 82 at or proximate a first end of the rotor shaft 90 and may be coupled to the gear reduction module 26 proximate a second end.

Referring to FIG. 2, the gear reduction module 26 may transmit torque between the electric motor module 24 and the drive pinion 22.

The gear reduction module 26 may be provided in various configurations, such as planetary gear set configurations and non-planetary gear set configurations. In FIG. 2, the gear reduction module 26 has a planetary gear set 100. In such a configuration, the gear reduction module 26 may include a sun gear 110, planet gears 112, a planetary ring gear 114, and a planet gear carrier 116.

Referring primarily to FIG. 3, the sun gear 110 may be disposed proximate the center of the planetary gear set 100 and may be rotatable about the first axis 60. In at least one configuration, the sun gear 110 may be configured as a hollow tubular body that may include a sun gear hole 120, a sun gear spline 122, a first gear portion 124, and a second gear portion 126.

The sun gear hole 120 may be a through hole that may extend through the sun gear 110. The sun gear hole 120 may extend along and may be centered about the first axis 60. The drive pinion 22 may extend through the sun gear hole 120 and may be spaced apart from the sun gear 110.

The sun gear spline 122 may facilitate coupling of the sun gear 110 to a rotor shaft 90. In at least one configuration, the sun gear spline 122 may be disposed opposite the sun gear hole 120 and may have teeth that may extend away from the sun gear hole 120. As such, the sun gear spline 122 may be received inside the rotor shaft 90 and may mesh or mate with corresponding teeth on the rotor shaft 90. It is also contemplated that the sun gear spline 122 may be disposed in the sun gear hole 120 and the rotor shaft 90 may be received inside the sun gear 110.

The first gear portion 124 may be disposed in the sun gear hole 120. Teeth of the first gear portion 124 may be arranged around the first axis 60, may extend toward the first axis 60, and may be configured to mesh with teeth of a shift collar 170 as will be discussed in more detail below.

The second gear portion 126 may be disposed opposite the sun gear hole 120 and may have teeth that may extend away from the sun gear hole 120. The teeth of the second gear portion 126 may mate or mesh with teeth of the planet gears 112.

Referring to FIGS. 2 and 3, the planet gears 112 may be rotatably disposed between the sun gear 110 and the planetary ring gear 114. Each planet gear 112 may have a hole and a set of teeth. The hole may be a through hole that may extend through the planet gear 112. The set of teeth may be disposed opposite the hole. The set of teeth may mesh with teeth of the second gear portion 126 of the sun gear 110 and teeth on the planetary ring gear 114. The teeth may have any suitable configuration. In the configuration shown, the teeth are provided with a helical configuration however, other tooth configurations may be provided. Each planet gear 112 may be configured to rotate about a different planet gear axis of rotation. The planet gear axes of rotation may extend substantially parallel to the first axis 60.

Referring to FIG. 3, the planetary ring gear 114 may extend around the first axis 60 and may receive the planet gears 112. The planetary ring gear 114 may include a set of planetary ring gear teeth that may extend toward the first axis 60 and may mesh with teeth on the planet gears 112. The planetary ring gear 114 may be stationary with respect to the first axis 60. For example, the planetary ring gear 114 may be received in and may be fixedly disposed on the housing assembly 20.

Referring to FIGS. 2 and 3, the planet gear carrier 116 may be rotatable about the first axis 60 and may rotatably support the planet gears 112. For instance, each planet gear 112 may be rotatably disposed on a corresponding pin that may extend from the planet gear carrier 116. In at least one configuration, the planet gear carrier 116 may include a planet gear carrier hole 130, a planet gear carrier ring 132, and a planet gear carrier gear portion 134.

Referring to FIG. 3, the planet gear carrier hole 130 may be a through hole that may extend through planet gear carrier 116. The planet gear carrier hole 130 may extend along and may be centered about the first axis 60.

The planet gear carrier ring 132 may extend around the first axis 60 and may at least partially define the planet gear carrier hole 130. The planet gear carrier ring 132 may be received in and may be rotatably supported by a support bearing 140.

The planet gear carrier gear portion 134 may be disposed in the planet gear carrier ring 132 and may extend into the planet gear carrier hole 130. Teeth of the planet gear carrier gear portion 134 may be arranged around the first axis 60 and may extend toward the first axis 60.

Referring to FIGS. 1-3, the auxiliary shaft 28 may protrude from the housing assembly 20. For example, the auxiliary shaft 28 may protrude from the housing assembly 20 and may extend away from the electric motor module 24 and the axle housing 40. In at least one configuration, the auxiliary shaft 28 may be rotatable about the first axis 60. The auxiliary shaft 28 may function as an output from the axle assembly 12, an input to the axle assembly 12, or combinations thereof. For example, the auxiliary shaft 28 may function as an output or a power take-off (PTO) that may transfer power or torque from the axle assembly 12 to an auxiliary device 150 that may be operatively connected to the auxiliary shaft 28. Examples of an auxiliary device 150 include but are not limited to a pump, ladder, vacuum, blower, compressor, winch, mechanical arm, compactor, boom, grapple, tree spade, dump truck bed lift, or the like. The auxiliary shaft 28 may also function as an input that may receive power or torque from an auxiliary device 150, such as engine like an internal combustion engine. As is best shown in FIG. 3, the auxiliary shaft 28 may be spaced apart from the drive pinion 22. In at least one configuration, the auxiliary shaft 28 may include an auxiliary shaft spline 160.

The auxiliary shaft spline 160 may mate or selectively mate with a corresponding spline on a shift collar of the shift mechanism 30 as will be discussed in more detail below. For example, the auxiliary shaft spline 160 may include a plurality of teeth that may be disposed substantially parallel to the first axis 60 and that may permit axial movement of the shift collar along the first axis 60.

Referring to FIGS. 1-3, the shift mechanism 30 may help control the transmission of torque through the axle assembly 12. In at least one configuration, the shift mechanism 30 may include a shift collar 170, an actuator 172, and a linkage 174.

Referring to FIG. 3, the shift collar 170 may selectively couple and decouple components of the axle assembly 12 such as the drive pinion 22, the gear reduction module 26, the auxiliary shaft 28, or combinations thereof. In at least one configuration, the shift collar 170 may receive the drive pinion 22. The auxiliary shaft 28 and may be partially received in the planet gear carrier 116. In the configuration shown in FIG. 3, the shift collar 170 may include a shift collar hole 180, a first shift collar spline 182, a second shift collar spline 184, a shift collar groove 186, and a shift collar gear 188.

The shift collar hole 180 may extend through the shift collar 170 and may extend around the first axis 60. The shift collar hole 180 may receive the shaft portion 72 of the drive pinion 22 and the auxiliary shaft 28.

The first shift collar spline 182 may be disposed in the shift collar hole 180 and may be axially positioned near a first end of the shift collar 170. The first shift collar spline 182 may extend toward the first axis 60 and may mate or mesh with the drive pinion spline 74 of the drive pinion 22. The mating splines may allow the shift collar 170 to move in an axial direction along the first axis 60 while inhibiting rotation of the shift collar 170 about the first axis 60 with respect to the drive pinion 22. Thus, the shift collar 170 may be rotatable about the first axis 60 with the drive pinion 22 when the shift collar 170 is coupled to the drive pinion 22 such that the first shift collar spline 182 mates or meshes with the drive pinion spline 74 of the drive pinion 22.

The second shift collar spline 184 may be disposed in the shift collar hole 180 and may be axially positioned near a second end of the shift collar 170. The second shift collar spline 184 may extend toward the first axis 60 and may mate or mesh with a spline of the auxiliary shaft 28. The mating splines may allow the shift collar 170 to move in an axial direction along the first axis 60 while inhibiting rotation of the shift collar 170 about the first axis 60 with respect to the auxiliary shaft 28. Thus, the shift collar 170 may be rotatable about the first axis 60 with the auxiliary shaft 28 when the shift collar 170 is coupled to the auxiliary shaft 28 such that the second shift collar spline 184 mates or meshes with the auxiliary shaft spline 160 of the auxiliary shaft 28.

The shift collar groove 186 may face away from the first axis 60 and may extend around the first axis 60. The shift collar groove 186 may receive the linkage 174.

The shift collar gear 188 may be disposed between the first end and the second end of the shift collar 170. The shift collar gear 188 may have at least one set of teeth that may be arranged around the first axis 60 and that may extend away from the first axis 60. In the configuration shown in FIG. 3, the shift collar gear 188 includes a first set of teeth 190 and a second set of teeth 192. An annular groove 200 may be provided between the first set of teeth 190 and the second set of teeth 192. The annular groove 200 may extend around the first axis 60 and may separate the first set of teeth 190 and the second set of teeth 192.

Referring to FIG. 1, the actuator 172 may be configured to move the shift collar 170 along the first axis 60. The actuator 172 may be of any suitable type. For example, the actuator 172 may be an electrical, electromechanical, pneumatic or hydraulic actuator.

Referring to FIG. 3, the linkage 174 may operatively connect the actuator 172 to the shift collar 170. For example, the linkage 174 may be configured as a shift fork that may extend from the shift collar 170 to the actuator 172. In at least one configuration, the linkage 174 may be received in the shift collar groove 186.

A control system may be provided with the drivetrain system 10. The control system may include one or more electronic controllers, such as a microprocessor-based controller. The control system may control operation of the axle assembly 12. For example, the controller may receive signals from various sensors, such as rotational speed sensors that may provide signals indicative of the rotational speed of a wheel, the axle shaft 34, the drive pinion 22, the sun gear 110, the rotor 82, or combinations thereof. In addition, the control system may control the actuator 172 and thereby control movement of the shift collar 170.

Referring to FIG. 2, the differential assembly 32 may be at least partially received in the center portion 50 of the housing assembly 20. The differential assembly 32 may transmit torque to the wheels and permit the wheels to rotate at different velocities. The differential assembly 32 may be operatively connected to the axle shafts 34 and may permit the axle shafts 34 to rotate at different rotational speeds in a manner known by those skilled in the art. The differential assembly 32 may have a ring gear 210 that may have teeth the mate or mesh with the teeth of the gear portion 70 of the drive pinion 22. Accordingly, the differential assembly 32 may receive torque from the drive pinion 22 via the ring gear 210 and transmit torque to the axle shafts 34.

Referring to FIGS. 1 and 2, the axle shafts 34 may transmit torque from the differential assembly 32 to corresponding wheel hubs and wheels. Two axle shafts 34 may be provided such that each axle shaft 34 extends through a different arm portion 52 of axle housing 40. The axle shafts 34 may extend along and may be rotatable about the second axis 220. Each axle shaft 34 may have a first end and a second end. The first end may be operatively connected to the differential assembly 32. The second end may be disposed opposite the first end and may be operatively connected to a wheel. Optionally, gear reduction may be provided between an axle shaft 34 and a wheel.

Referring to FIGS. 3-19, operation of the drivetrain system 10 will now be discussed in more detail. In these figures, the straight arrowed lines represent the transmission of torque. In FIGS. 3-14, the shift collar 170 may be rotatable about the first axis 60 with the auxiliary shaft 28 and may selectively couple the auxiliary shaft 28 to the drive pinion 22, the gear reduction module 26, or the drive pinion 22 and the gear reduction module 26. In FIGS. 15-19, the shift collar may selectively couple the gear reduction module 26 to the auxiliary shaft 28 or the drive pinion 22.

Referring to FIGS. 3-6, the auxiliary shaft 28 is configured to function as an output or power take-off and is operatively connected to at least one auxiliary device 150.

In FIG. 3, the shift collar 170 is shown in a first position. In the first position, the shift collar 170 may couple the drive pinion 22 and the auxiliary shaft 28 such that the drive pinion 22, the shift collar 170, and the auxiliary shaft 28 may be rotatable together about the first axis 60. For example, the first shift collar spline 182 may mate or mesh with the drive pinion spline 74 and the second shift collar spline 184 may mate or mesh with the auxiliary shaft spline 160. The shift collar 170 may be decoupled from the gear reduction module 26 when the shift collar 170 is in the first position. For instance, the shift collar gear 188 may be spaced apart from and may not mate or mesh with the second gear portion 126 of the sun gear 110 or the planet gear carrier gear portion 134 of the planet gear carrier 116. Accordingly, the electric motor module 24 may not provide torque to the drive pinion 22 or the auxiliary shaft 28 or receive torque from the drive pinion 22 or the auxiliary shaft 28. The drive pinion 22, the shift collar 170, and the auxiliary shaft 28 may be coupled but may not rotate about the first axis 60 when the vehicle is stationary. The drive pinion 22, shift collar 170, and the auxiliary shaft 28 may be coupled and may rotate about the first axis 60 when the vehicle is coasting and torque is provided from the rotating vehicle wheels to the drive pinion 22 via the axle shafts 34 and the differential assembly 32.

Figure 4:
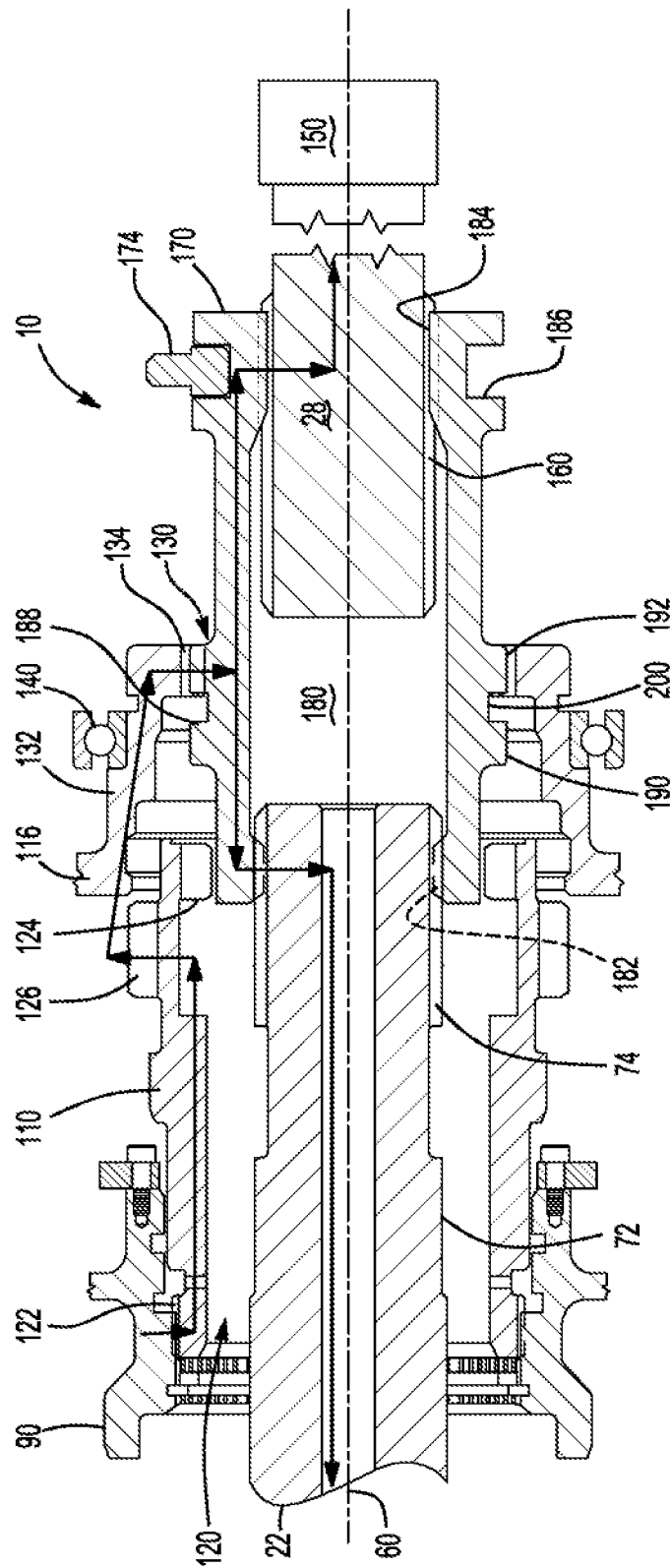

In FIG. 4, the shift collar 170 is shown in a second position. In the second position, the shift collar 170 may couple the drive pinion 22, the planet gear carrier 116 of the gear reduction module 26, and the auxiliary shaft 28 such that the drive pinion 22, the planet gear carrier 116, the shift collar 170, and the auxiliary shaft 28 may be rotatable together about the first axis 60. For example, the first shift collar spline 182 may mate or mesh with the drive pinion spline 74, the second shift collar spline 184 may mate or mesh with the auxiliary shaft spline 160, and the second set of teeth 192 of the shift collar gear 188 may mate or mesh with the planet gear carrier gear portion 134. The second position may also be referred to as a low range position in which the gear reduction module 26 may provide a low range gear ratio.

The electric motor module 24 may provide torque to the sun gear 110 via the rotor shaft 90, the sun gear 110 may provide torque to the planet gear carrier 116 via the planet gears 112, and the planet gear carrier 116 may provide torque to the drive pinion 22 and the auxiliary shaft 28 via the shift collar 170 when the shift collar is in the second position and the electrical power source provides electrical power to the electric motor module 24. In addition, it is contemplated that the electric motor module 24 may receive torque or may act as a generator that may charge the electrical power source when the vehicle is coasting, in which case torque may be provided from the rotating vehicle wheels to the drive pinion 22 via the axle shafts 34 and the differential assembly 32, and thus the drive pinion 22 may provide torque to the auxiliary shaft 28 and to the electric motor module 24 via the planet gear carrier 116 of the gear reduction module 26 when the shift collar 170 is in the second position. The shift collar 170 may be decoupled from the sun gear 110 when the shift collar 170 is in the second position.

Figure 5:
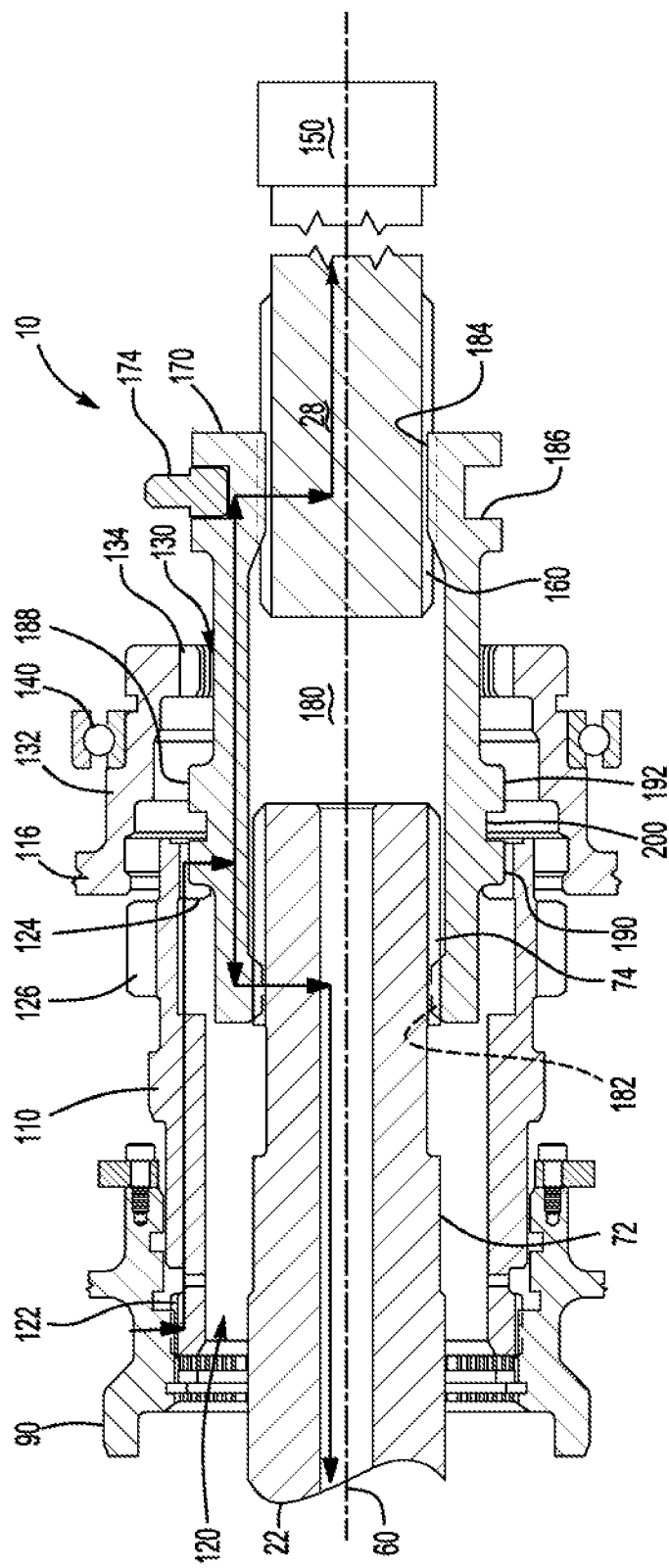

In FIG. 5, the shift collar 170 is shown in a third position. In the third position, the shift collar 170 may couple the drive pinion 22, the sun gear 110 of the gear reduction module 26, and the auxiliary shaft 28 such that the drive pinion 22, the sun gear 110, the shift collar 170, and the auxiliary shaft 28 may be rotatable together about the first axis 60. For example, the first shift collar spline 182 may mate or mesh with the drive pinion spline 74, the second shift collar spline 184 may mate or mesh with the auxiliary shaft spline 160, and the first set of teeth 190 of the shift collar gear 188 may mate or mesh with the first gear portion 124 of the sun gear 110. The third position may also be referred to as a high range position in which the gear reduction module 26 may provide a high range gear ratio. The high range gear ratio may provide a different gear reduction ratio or lesser gear reduction ratio than the low range gear ratio. As a nonlimiting example, the high range gear ratio may provide a 1:1 gear ratio. The second drive gear ratio may facilitate faster vehicle cruising or a cruising gear ratio that may help improve fuel economy.

The electric motor module 24 may provide torque to the sun gear 110 via the rotor shaft 90 and the sun gear 110 may provide torque to the drive pinion 22 and the auxiliary shaft 28 via the shift collar 170 when the shift collar is in the third position and the electrical power source provides electrical power to the electric motor module 24. In addition, it is contemplated that the electric motor module 24 may receive torque or may act as a generator that may charge the electrical power source when the vehicle is coasting, in which case torque may be provided from the rotating vehicle wheels to the drive pinion 22 via the axle shafts 34 and the differential assembly 32 and thus the drive pinion 22 may provide torque to the auxiliary shaft 28 and to the electric motor module 24 via the sun gear 110 of the gear reduction module 26 when the shift collar 170 is in the third position. The shift collar 170 may be decoupled from the planet gear carrier 116 when the shift collar 170 is in the third position.

Figure 6:
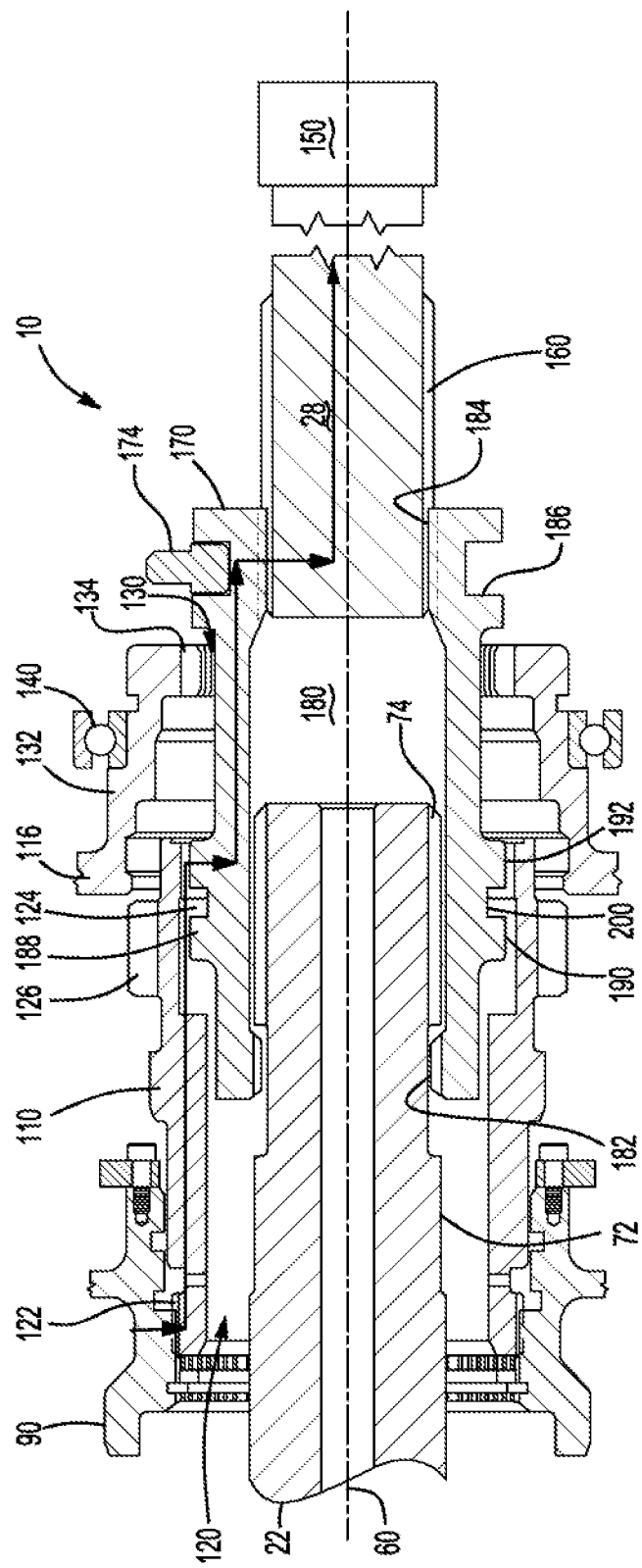

In FIG. 6, the shift collar 170 is shown in a fourth position. In the fourth position, the shift collar 170 may couple the sun gear 110 of the gear reduction module 26 to the auxiliary shaft 28 such that the sun gear 110, the shift collar 170, and the auxiliary shaft 28 may be rotatable together about the first axis 60. For example, the second shift collar spline 184 may mate or mesh with the auxiliary shaft spline 160 and the second set of teeth 192 of the shift collar gear 188 may mate or mesh with the first gear portion 124 of the sun gear 110. The fourth position may also be a high range position in which the gear reduction module 26 may provide a high range gear ratio or the same gear ratio as the third position. The drive pinion 22 may be decoupled from the shift collar 170 when the shift collar 170 is in the fourth position. For example, the first shift collar spline 182 may be decoupled from and may not mate or mesh with the drive pinion spline 74.

The electric motor module 24 may provide torque to the sun gear 110 via the rotor shaft 90 and the sun gear 110 may provide torque to the auxiliary shaft 28 via the shift collar 170 when the shift collar is in the fourth position and the electrical power source provides electrical power to the electric motor module 24. Accordingly, the fourth position may be employed when the vehicle is stationary and it is desired to provide power to the auxiliary shaft 28. In addition, it is contemplated that shift collar 170 may be configured to provide torque to the auxiliary shaft 28 via the planet gear carrier 116 rather than the sun gear 110 when the shift collar 170 is decoupled from the drive pinion 22.

Referring to FIGS. 7-10, the auxiliary shaft 28 may be configured to function as an input and may receive torque from an auxiliary device 150, such as an internal combustion engine. For instance, the auxiliary device 150 may be a torque source that is connected in a series hybrid configuration. The shift collar positions in FIGS. 7-10 match those shown in FIGS. 3-6, but the torque transmission paths are different since the auxiliary shaft 28 may function as an input rather than an output.

Figure 7:
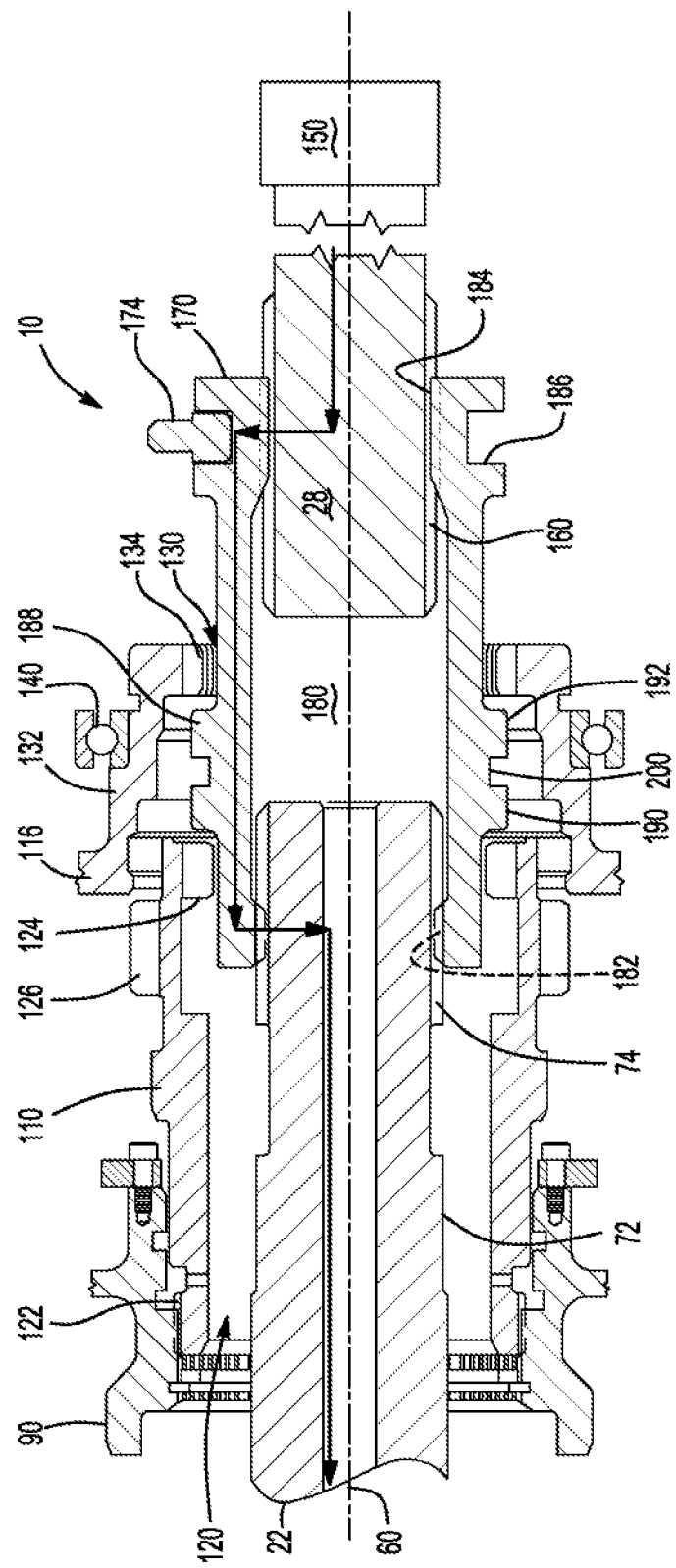
FIGS. 7-10 show the shift collar in first, second, third, and fourth positions, respectively, and torque flow paths associated with a series hybrid configuration.

In FIG. 7, the shift collar 170 is shown in a first position. In the first position, the shift collar 170 may couple the drive pinion 22 and the auxiliary shaft 28 such that the drive pinion 22, the shift collar 170, and the auxiliary shaft 28 may be rotatable together about the first axis 60. For example, the first shift collar spline 182 may mate or mesh with the drive pinion spline 74 and the second shift collar spline 184 may mate or mesh with the auxiliary shaft spline 160. The shift collar 170 may be decoupled from the gear reduction module 26 when the shift collar 170 is in the first position. For instance, the shift collar gear 188 may be spaced apart from and may not mate or mesh with the second gear portion 126 of the sun gear 110 or the planet gear carrier gear portion 134 of the planet gear carrier 116. Accordingly, the electric motor module 24 may not provide torque to the drive pinion 22 or the auxiliary shaft 28 and may not receive torque from the drive pinion 22 or the auxiliary shaft 28. The auxiliary device 150 may therefore provide torque to propel the vehicle and regenerative torque may not be provided to the electric motor module 24 when the vehicle is coasting.

Figure 8:
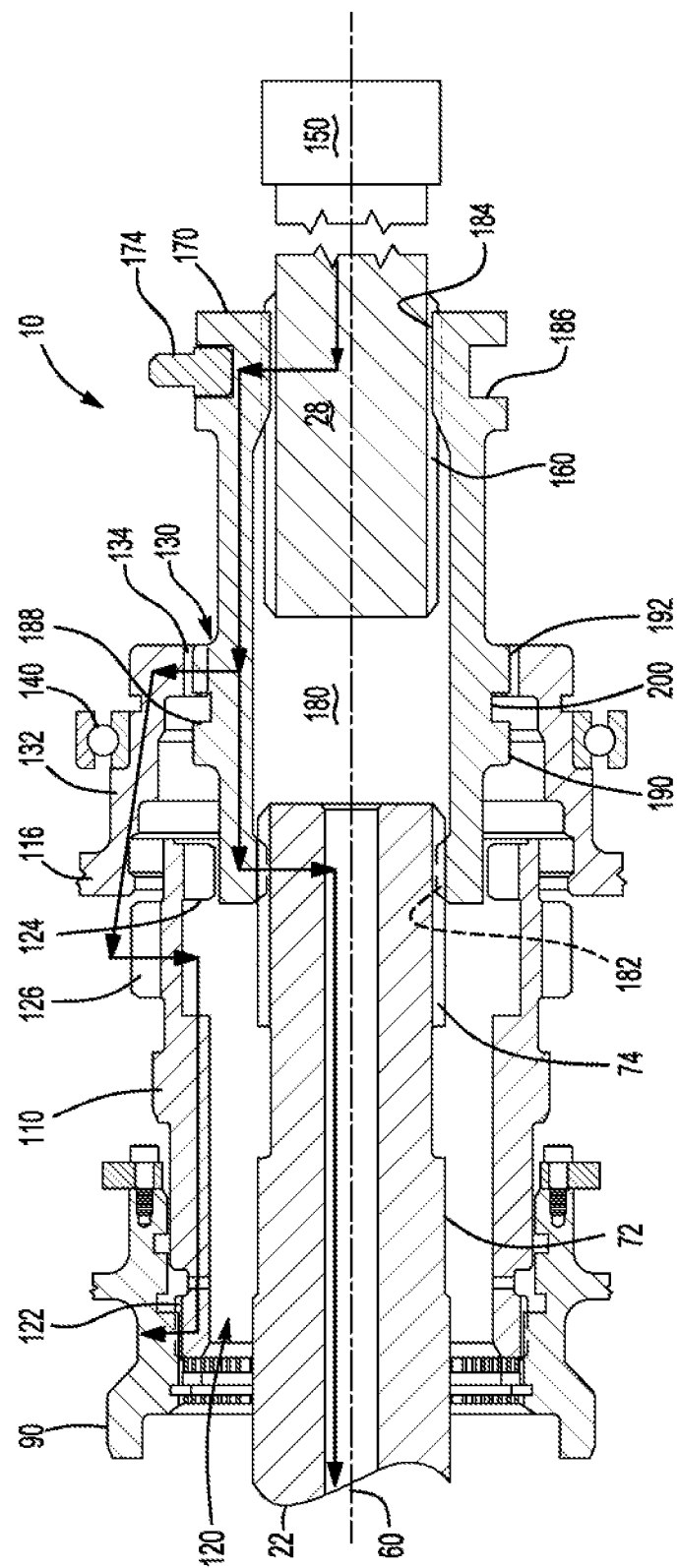

In FIG. 8, the shift collar 170 is shown in a second position. In the second position, the shift collar 170 may couple the drive pinion 22, the planet gear carrier 116 of the gear reduction module 26, and the auxiliary shaft 28 such that the drive pinion 22, the planet gear carrier 116, the shift collar 170, and the auxiliary shaft 28 may be rotatable together about the first axis 60. For example, the first shift collar spline 182 may mate or mesh with the drive pinion spline 74, the second shift collar spline 184 may mate or mesh with the auxiliary shaft spline 160, and the second set of teeth 192 of the shift collar gear 188 may mate or mesh with the planet gear carrier gear portion 134. The second position may also be referred to as a low range position in which the gear reduction module 26 may provide a low range gear ratio. Accordingly, the auxiliary device 150 may provide torque to propel the vehicle and regenerative torque to the electric motor module 24 such that the electric motor module 24 may act as a generator that may charge the electrical power source. In addition, regenerative torque may be provided to the electric motor module 24 via the low range gear ratio when the vehicle is coasting.

Figure 9:
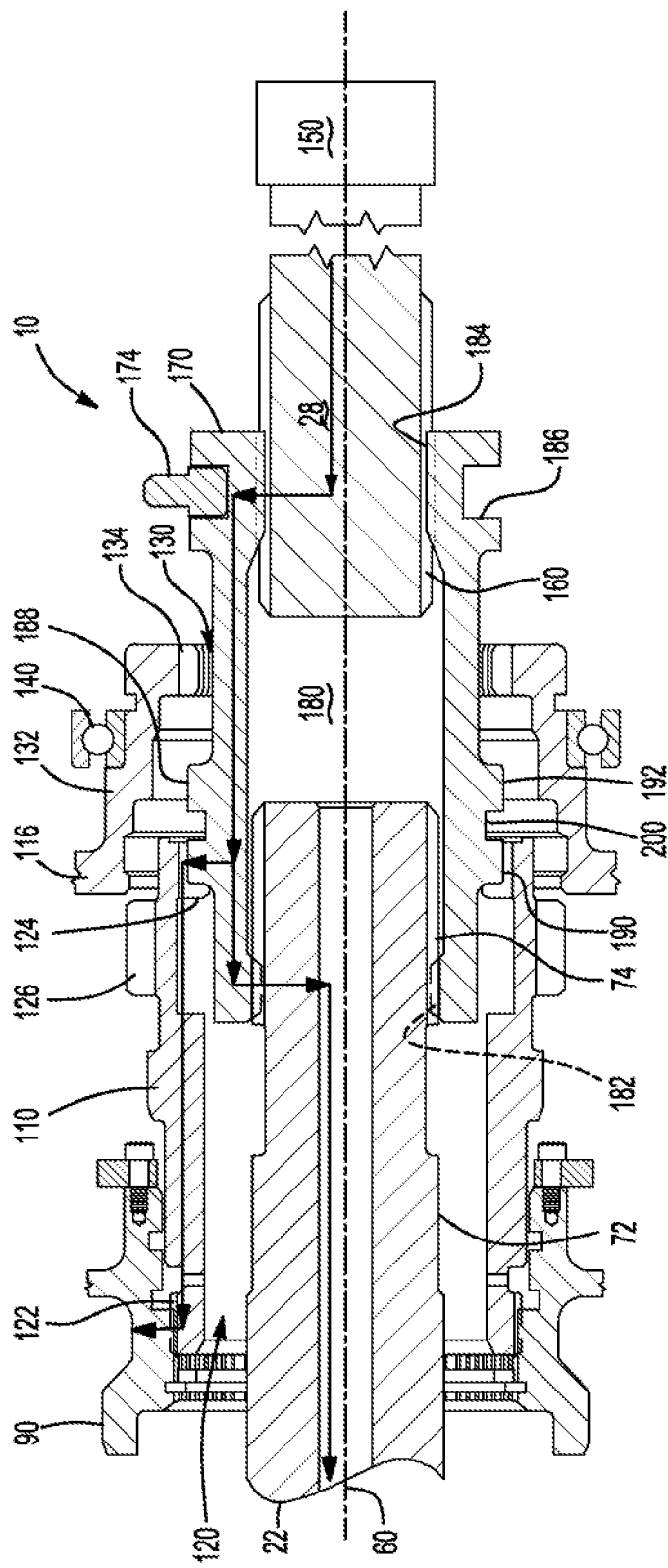

In FIG. 9, the shift collar 170 is shown in a third position. In the third position, the shift collar 170 may couple the drive pinion 22, the sun gear 110 of the gear reduction module 26, and the auxiliary shaft 28 such that the drive pinion 22, the sun gear 110, the shift collar 170, and the auxiliary shaft 28 may be rotatable together about the first axis 60. For example, the first shift collar spline 182 may mate or mesh with the drive pinion spline 74, the second shift collar spline 184 may mate or mesh with the auxiliary shaft spline 160, and the first set of teeth 190 of the shift collar gear 188 may mate or mesh with the first gear portion 124 of the sun gear 110. The third position may also be referred to as a high range position in which the gear reduction module 26 may provide a high range gear ratio as previously discussed. Accordingly, the auxiliary device 150 may provide torque to propel the vehicle and may provide regenerative torque to the electric motor module 24 such that the electric motor module 24 may act as a generator that may charge the electrical power source. In addition, regenerative torque may be provided to the electric motor module 24 via the high range gear ratio when the vehicle is coasting.

Figure 10:
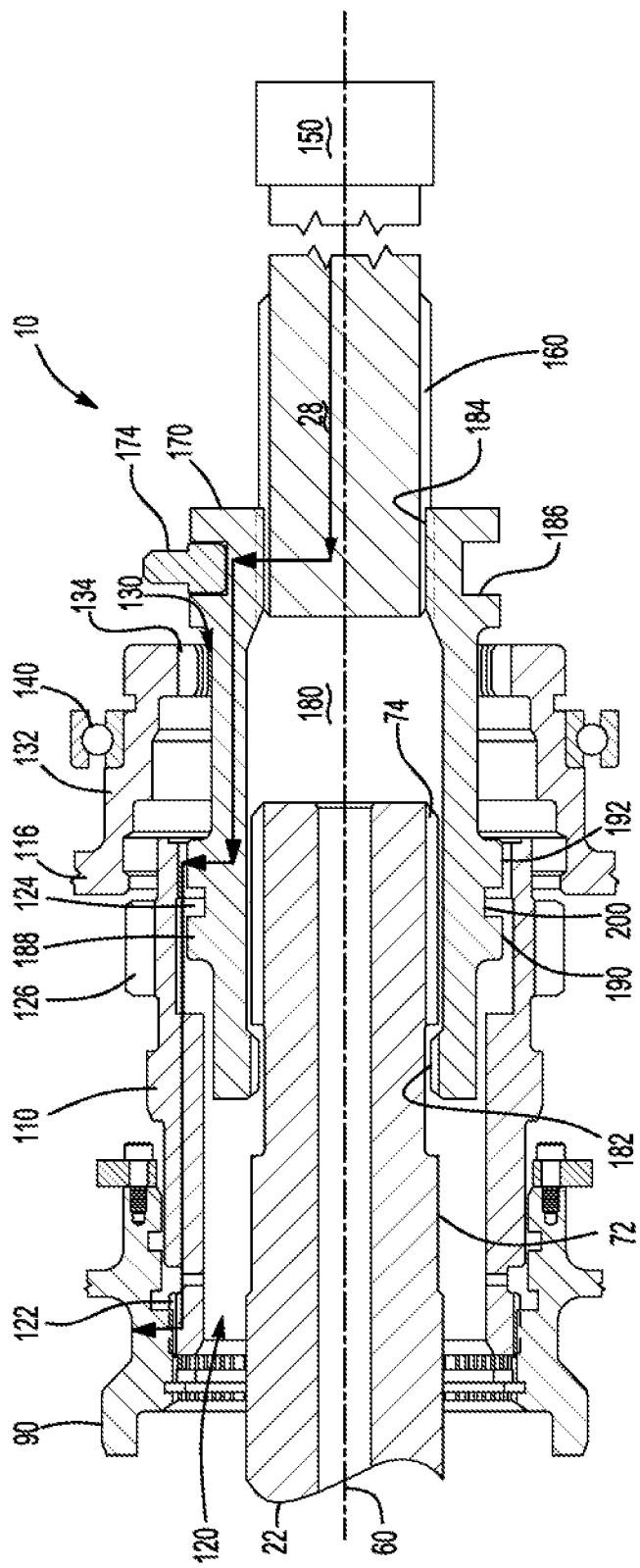

In FIG. 10, the shift collar 170 is shown in a fourth position. In the fourth position, the shift collar 170 may couple the sun gear 110 of the gear reduction module 26 to the auxiliary shaft 28 such that the sun gear 110, the shift collar 170, and the auxiliary shaft 28 may be rotatable together about the first axis 60. For example, the second shift collar spline 184 may mate or mesh with the auxiliary shaft spline 160 and the second set of teeth 192 of the shift collar gear 188 may mate or mesh with the first gear portion 124 of the sun gear 110. The fourth position may also be a high range position in which the gear reduction module 26 may provide a high range gear ratio or the same gear ratio as the third position. The drive pinion 22 may be decoupled from the shift collar 170 when the shift collar 170 is in the fourth position. Accordingly, the auxiliary device 150 may not provide torque to propel the vehicle and may provide regenerative torque to the electric motor module 24 such that the electric motor module 24 may act as a generator that may charge the electrical power source. In addition, it is contemplated that shift collar 170 may be configured to provide regenerative torque to the electric motor module 24 via the low range gear ratio when the shift collar 170 is decoupled from the drive pinion 22.

Referring to FIGS. 11-14, the auxiliary shaft 28 may be configured to function as an input and may receive torque from an auxiliary device 150, such as an internal combustion engine. For instance, the auxiliary device 150 may be a torque source that is connected in a parallel hybrid configuration. The shift collar positions in FIGS. 11-14 match those shown in FIGS. 7-10, but the torque transmission paths may differ.

Figure 11:
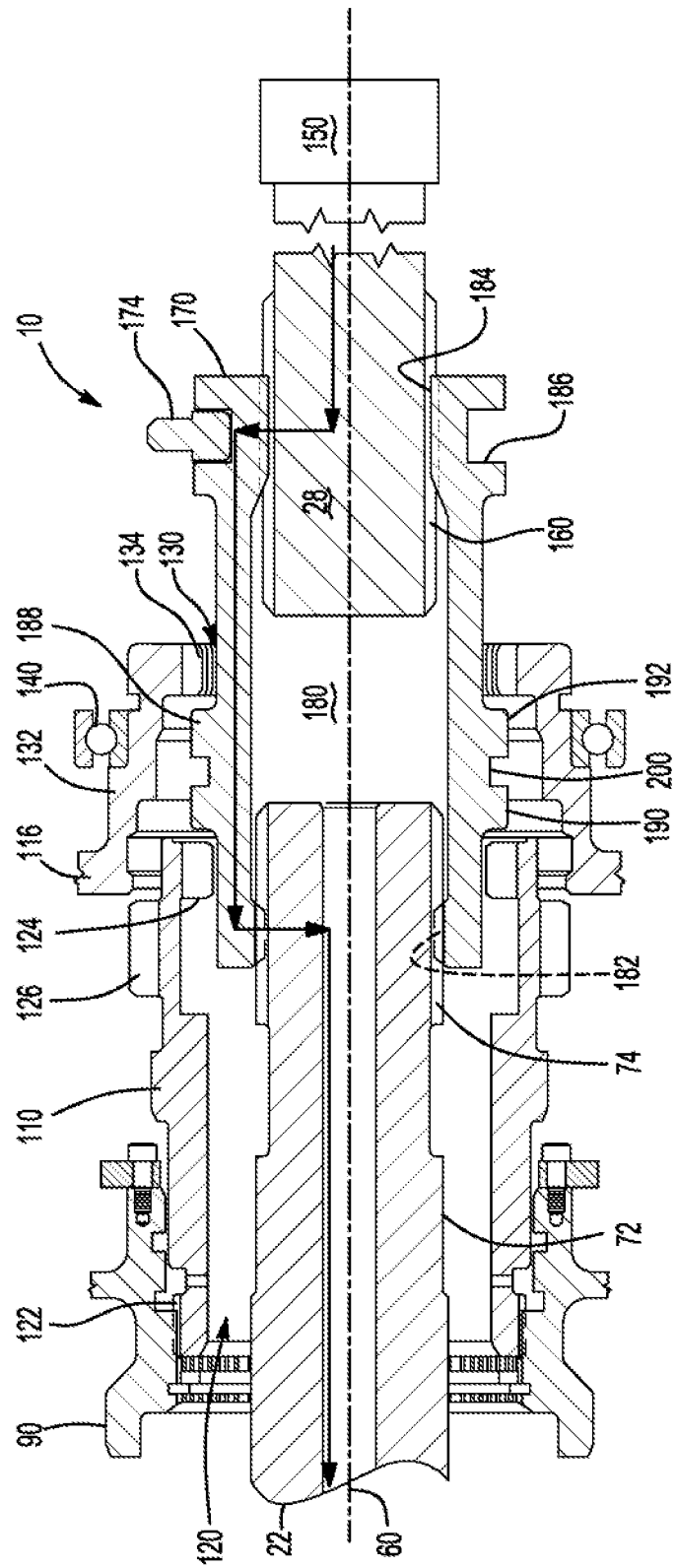
FIGS. 11-14 show the shift collar in first, second, third, and fourth positions, respectively, and torque flow paths associated with a parallel hybrid configuration.

In FIG. 11, the shift collar 170 is shown in a first position. In the first position, the shift collar 170 may couple the drive pinion 22 and the auxiliary shaft 28 such that the drive pinion 22, the shift collar 170, and the auxiliary shaft 28 may be rotatable together about the first axis 60. For example, the first shift collar spline 182 may mate or mesh with the drive pinion spline 74 and the second shift collar spline 184 may mate or mesh with the auxiliary shaft spline 160. The shift collar 170 may be decoupled from the gear reduction module 26 when the shift collar 170 is in the first position. For instance, the shift collar gear 188 may be spaced apart from and may not mate or mesh with the second gear portion 126 of the sun gear 110 or the planet gear carrier gear portion 134 of the planet gear carrier 116. Accordingly, the electric motor module 24 may not provide torque to the drive pinion 22 or the auxiliary shaft 28 and may not receive torque from the drive pinion 22 or the auxiliary shaft 28. The auxiliary device 150 may therefore provide torque to propel the vehicle and regenerative torque may not be provided to the electric motor module 24 when the vehicle is coasting.

Figure 12:
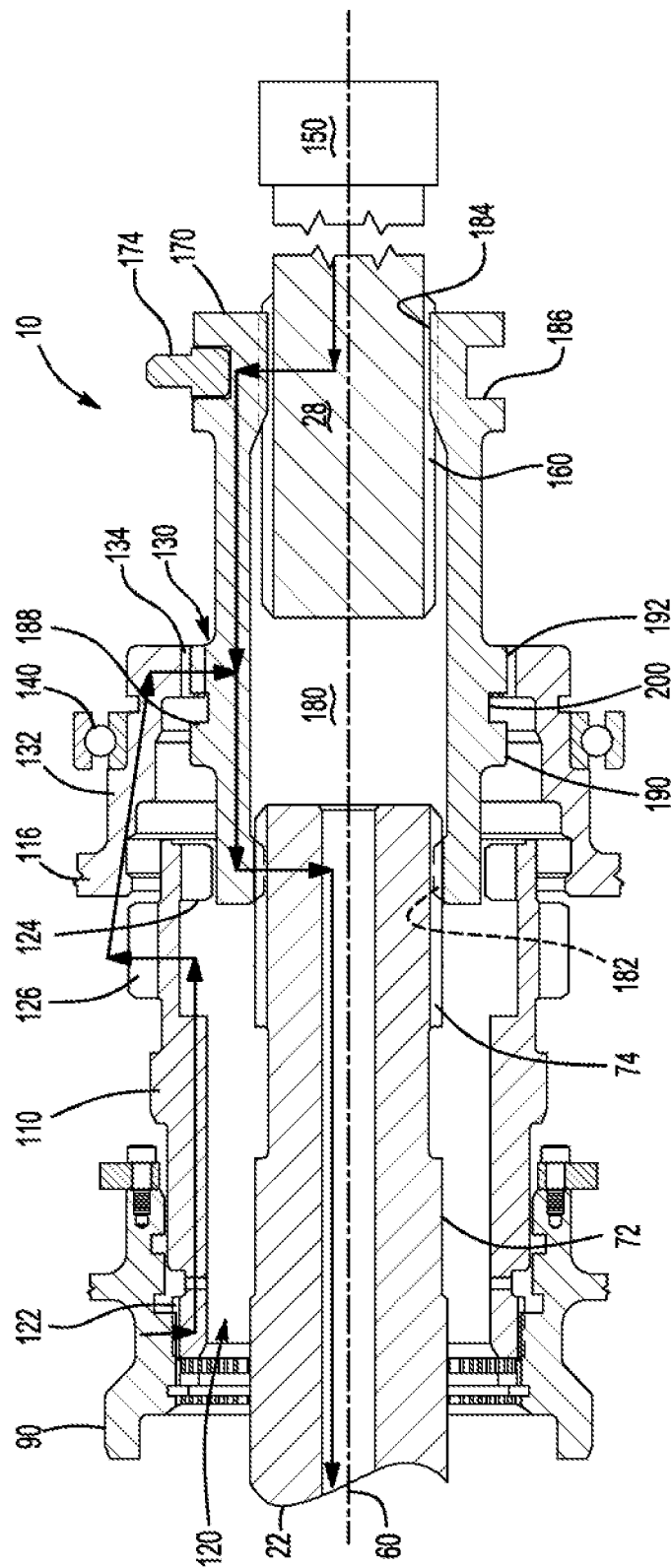

In FIG. 12, the shift collar 170 is shown in a second position. In the second position, the shift collar 170 may couple the drive pinion 22, the planet gear carrier 116 of the gear reduction module 26, and the auxiliary shaft 28 such that the drive pinion 22, the planet gear carrier 116, the shift collar 170, and the auxiliary shaft 28 may be rotatable together about the first axis 60. For example, the first shift collar spline 182 may mate or mesh with the drive pinion spline 74, the second shift collar spline 184 may mate or mesh with the auxiliary shaft spline 160, and the second set of teeth 192 of the shift collar gear 188 may mate or mesh with the planet gear carrier gear portion 134. The second position may also be referred to as a low range position in which the gear reduction module 26 may provide a low range gear ratio. Accordingly, the electric motor module 24, the auxiliary device 150, or both may provide torque to propel the vehicle. In addition, regenerative torque may be provided to the electric motor module 24 via the low range gear ratio when the vehicle is coasting.

Figure 13:
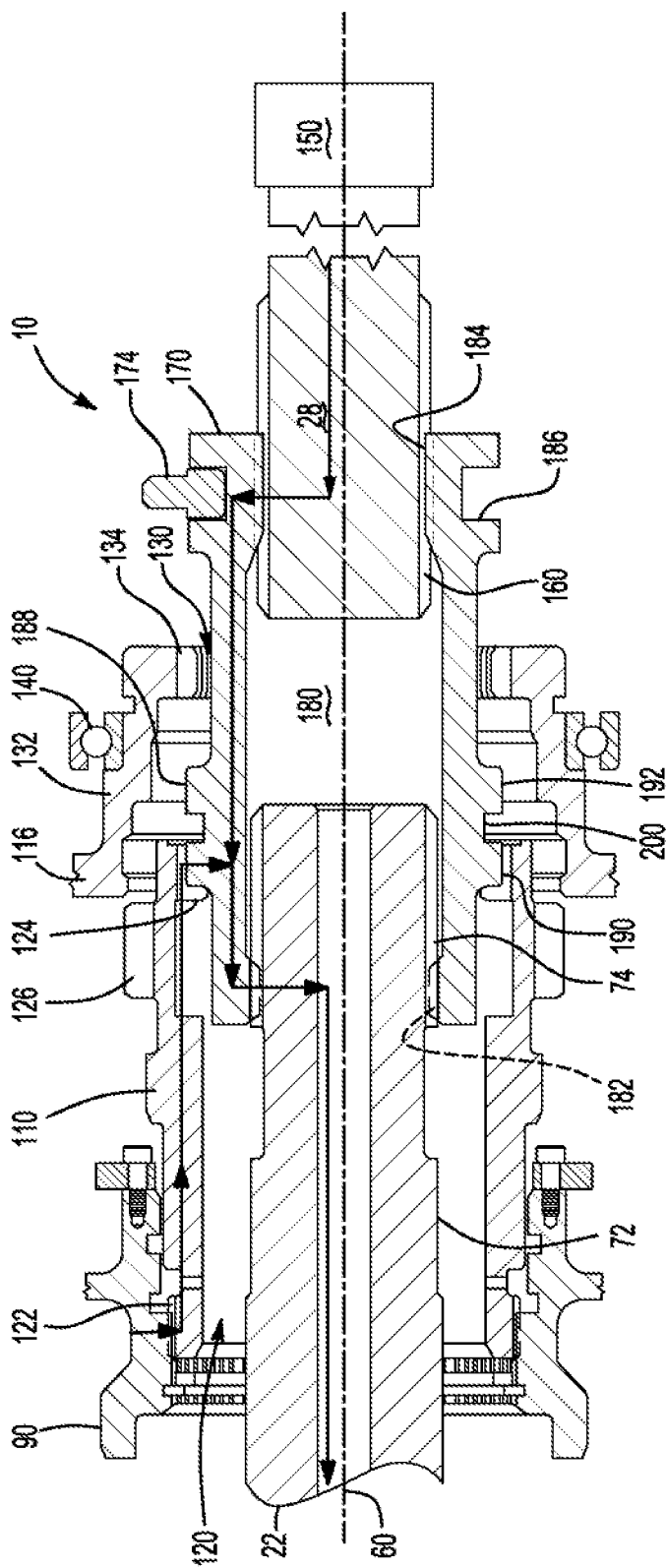

In FIG. 13, the shift collar 170 is shown in a third position. In the third position, the shift collar 170 may couple the drive pinion 22, the sun gear 110 of the gear reduction module 26, and the auxiliary shaft 28 such that the drive pinion 22, the sun gear 110, the shift collar 170, and the auxiliary shaft 28 may be rotatable together about the first axis 60. For example, the first shift collar spline 182 may mate or mesh with the drive pinion spline 74, the second shift collar spline 184 may mate or mesh with the auxiliary shaft spline 160, and the first set of teeth 190 of the shift collar gear 188 may mate or mesh with the first gear portion 124 of the sun gear 110. The third position may also be referred to as a high range position in which the gear reduction module 26 may provide a high range gear ratio as previously discussed. Accordingly, the electric motor module 24, the auxiliary device 150, or both may provide torque to propel the vehicle. In addition, regenerative torque may be provided to the electric motor module 24 via the high range gear ratio when the vehicle is coasting.

Figure 14:
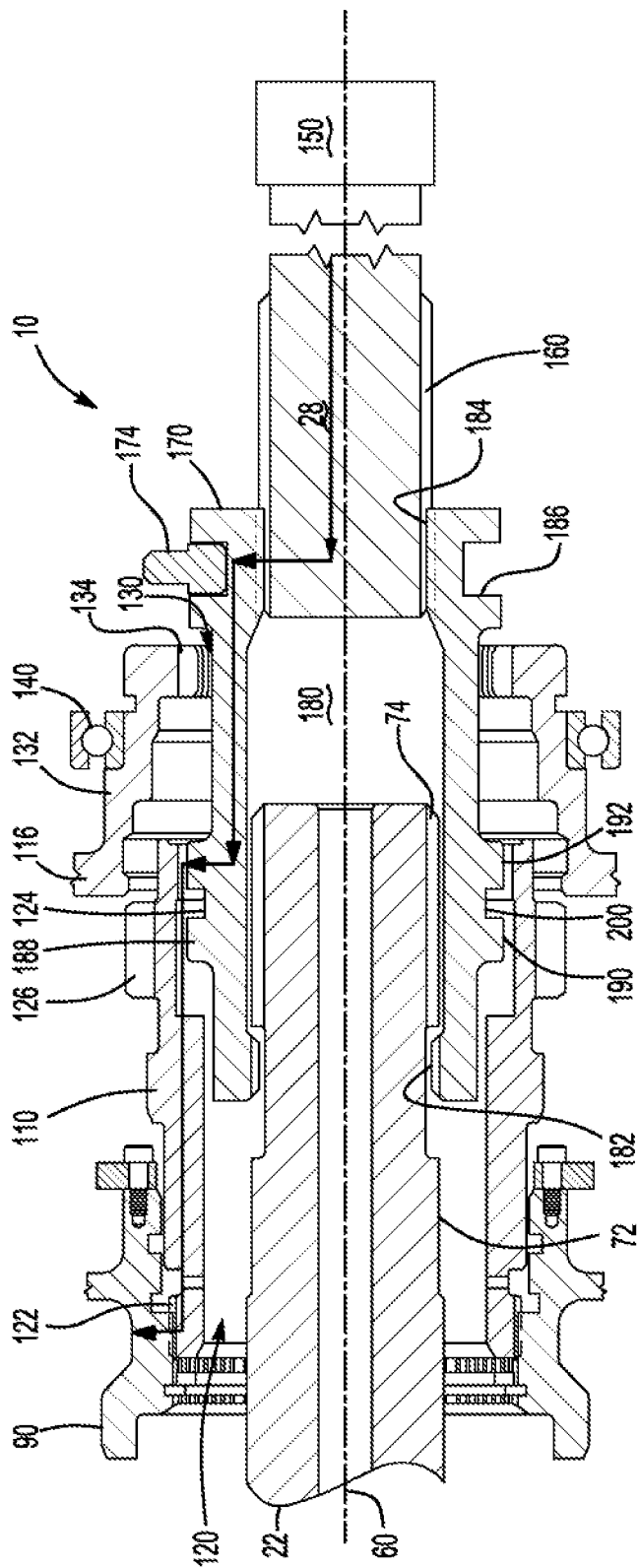

In FIG. 14, the shift collar 170 is shown in a fourth position. The fourth position in FIG. 14 may be the same as the fourth position and description associated with FIG. 10.

Referring to FIGS. 15-19, the shift collar 170' is shown with a different configuration than the shift collar 170 previously discussed. In the configuration shown, the shift collar gear 188 of the shift collar 170' may include a third set of teeth 194 in addition to the first set of teeth 190 and the second set of teeth 192. The second set of teeth 192 may be positioned between the first set of teeth 190 and the third set of teeth 194. A second annular groove 202 may be provided between the second set of teeth 192 and the third set of teeth 194. The second annular groove 202 groove may extend around the first axis 60 and may separate the second set of teeth 192 from the third set of teeth 194. In FIGS. 15-19, the auxiliary shaft 28 is configured to function as an output or power take-off and may be operatively connected to at least one auxiliary device 150 at previously discussed. In addition, the shift collar 170' may be configured to selectively couple the gear reduction module 26 to the drive pinion 22 or the auxiliary shaft 28 in FIGS. 15-19, which may differ from the configurations shown in FIGS. 3-14 in which the shift collar 170 remains coupled to the auxiliary shaft 28.

Figure 15:
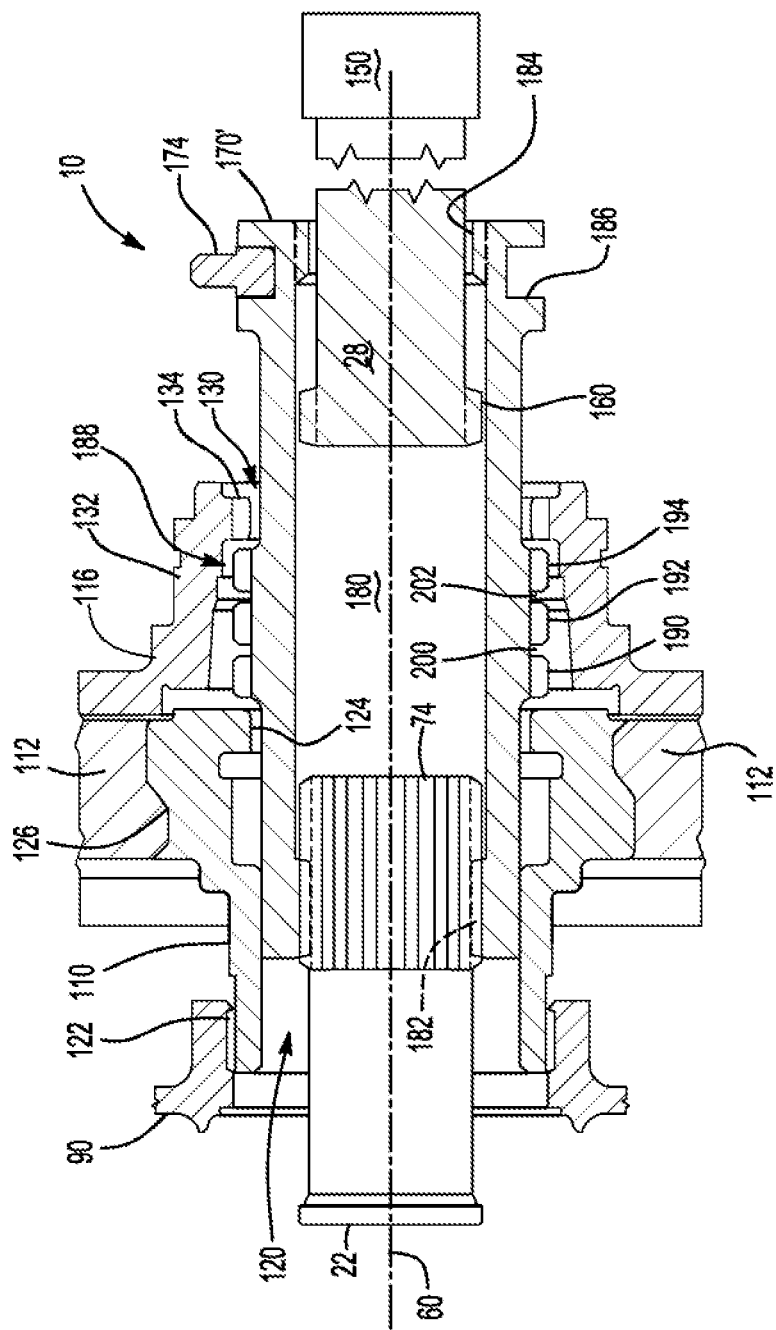

In FIG. 15, the shift collar 170' is shown in a first neutral position. The shift collar 170' may be coupled to the drive pinion 22 such that the shift collar 170' and the drive pinion 22 may be rotatable together about the first axis 60. For example, the first shift collar spline 182 may mate or mesh with the drive pinion spline 74. The shift collar 170' may be decoupled from the gear reduction module 26 and may be decoupled from the auxiliary shaft 28 when the shift collar 170' is in the first neutral position. For instance, the shift collar gear 188 may be spaced apart from and may not mate or mesh with the first gear portion 124 of the sun gear 110 or the planet gear carrier gear portion 134 of the planet gear carrier 116, and the second shift collar spline 184 may be spaced apart from and may not mate or mesh with the auxiliary shaft spline 160. The drive pinion 22 and the shift collar 170' may rotate about the first axis 60 when the vehicle is coasting and torque is provided from the rotating vehicle wheels to the drive pinion 22 via the axle shafts 34 and the differential assembly 32.

Figure 16:
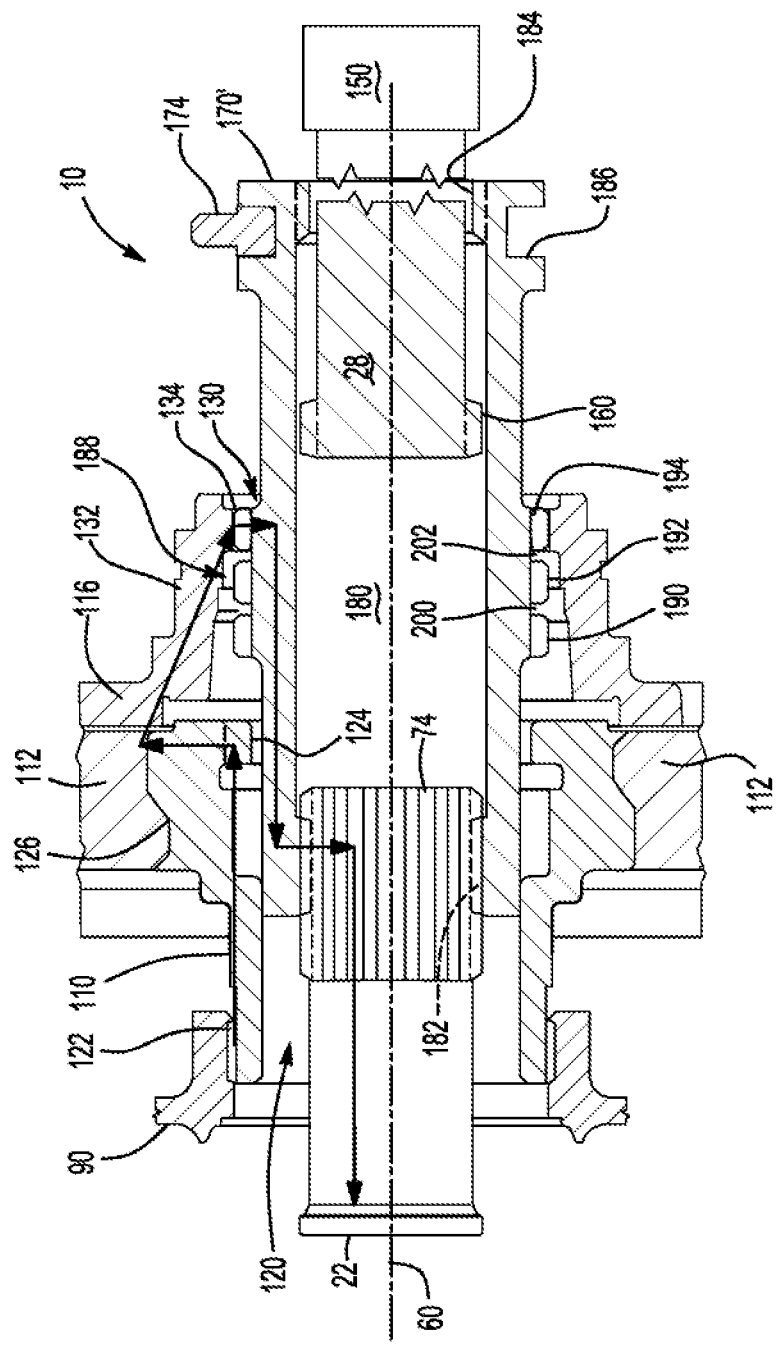

In FIG. 16, the shift collar 170' is shown in a low range position. The shift collar 170' may couple the drive pinion 22 to the planet gear carrier 116 of the gear reduction module 26 such that the drive pinion 22, the planet gear carrier 116, and the shift collar 170' may be rotatable together about the first axis 60. For example, the first shift collar spline 182 may mate or mesh with the drive pinion spline 74, and the third set of teeth 194 of the shift collar gear 188 may mate or mesh with the planet gear carrier gear portion 134. The gear reduction module 26 may provide a low range gear ratio in the low range position. The electric motor module 24 may provide torque to the sun gear 110 via the rotor shaft 90, the sun gear 110 may provide torque to the planet gear carrier 116 via the planet gears 112, and the planet gear carrier 116 may provide torque to the drive pinion 22 via the shift collar 170' when the shift collar is in the low range position and the electrical power source provides electrical power to the electric motor module 24. The shift collar 170' may be decoupled from the auxiliary shaft 28 and the sun gear 110 when the shift collar 170' is in the low range position.

Figure 17:
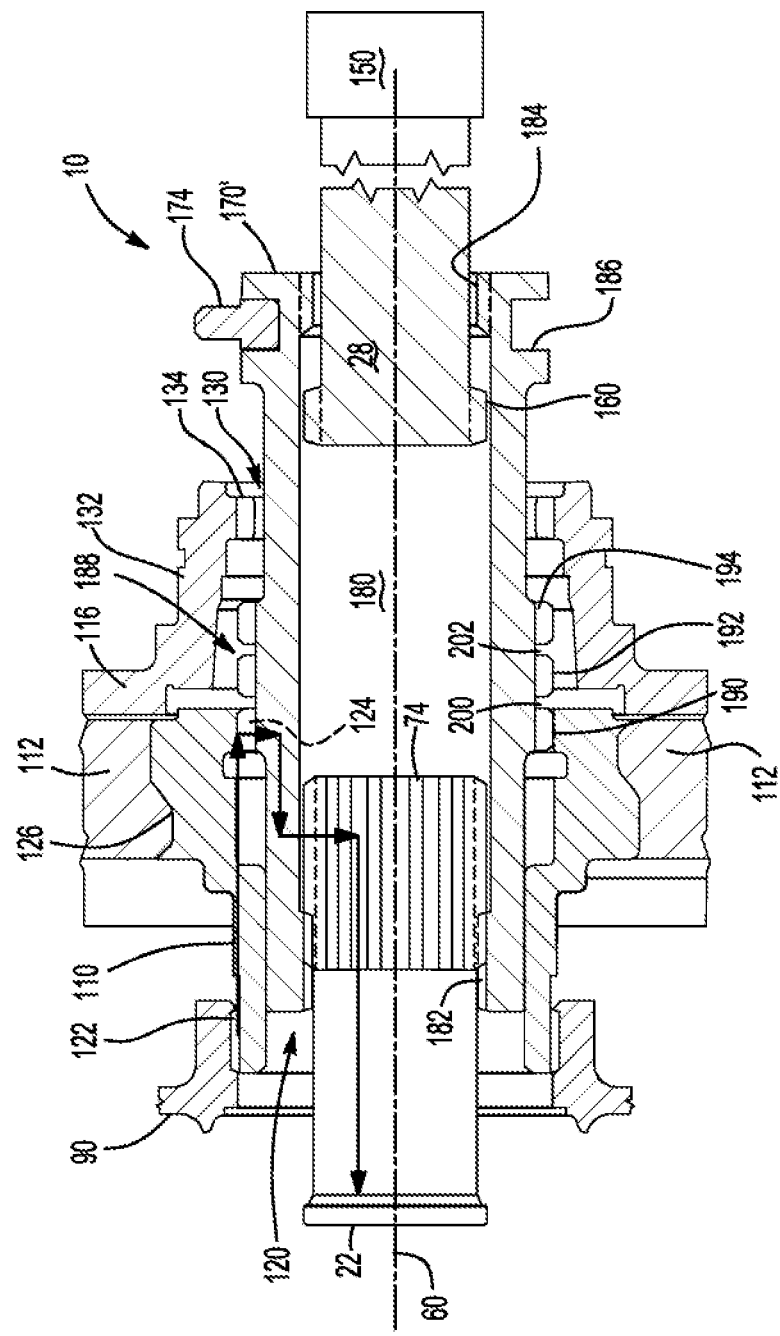

In FIG. 17, the shift collar 170' is shown in a high range position. The shift collar 170' may couple the drive pinion 22 to the sun gear 110 of the gear reduction module 26 such that the drive pinion 22, the sun gear 110, and the shift collar 170' may be rotatable together about the first axis 60. For example, the first shift collar spline 182 may mate or mesh with the drive pinion spline 74, and the first set of teeth 190 of the shift collar gear 188 may mate or mesh with the first gear portion 124 of the sun gear 110. The gear reduction module 26 may provide a high range gear ratio in the high range position. The electric motor module 24 may provide torque to the sun gear 110 via the rotor shaft 90, and the sun gear 110 may provide torque to the drive pinion 22 via the shift collar 170' when the shift collar is in the high range position and the electrical power source provides electrical power to the electric motor module 24. The shift collar 170' may be decoupled from the auxiliary shaft 28 and the planet gear carrier 116 when the shift collar 170' is in the high range position.

Figure 18:
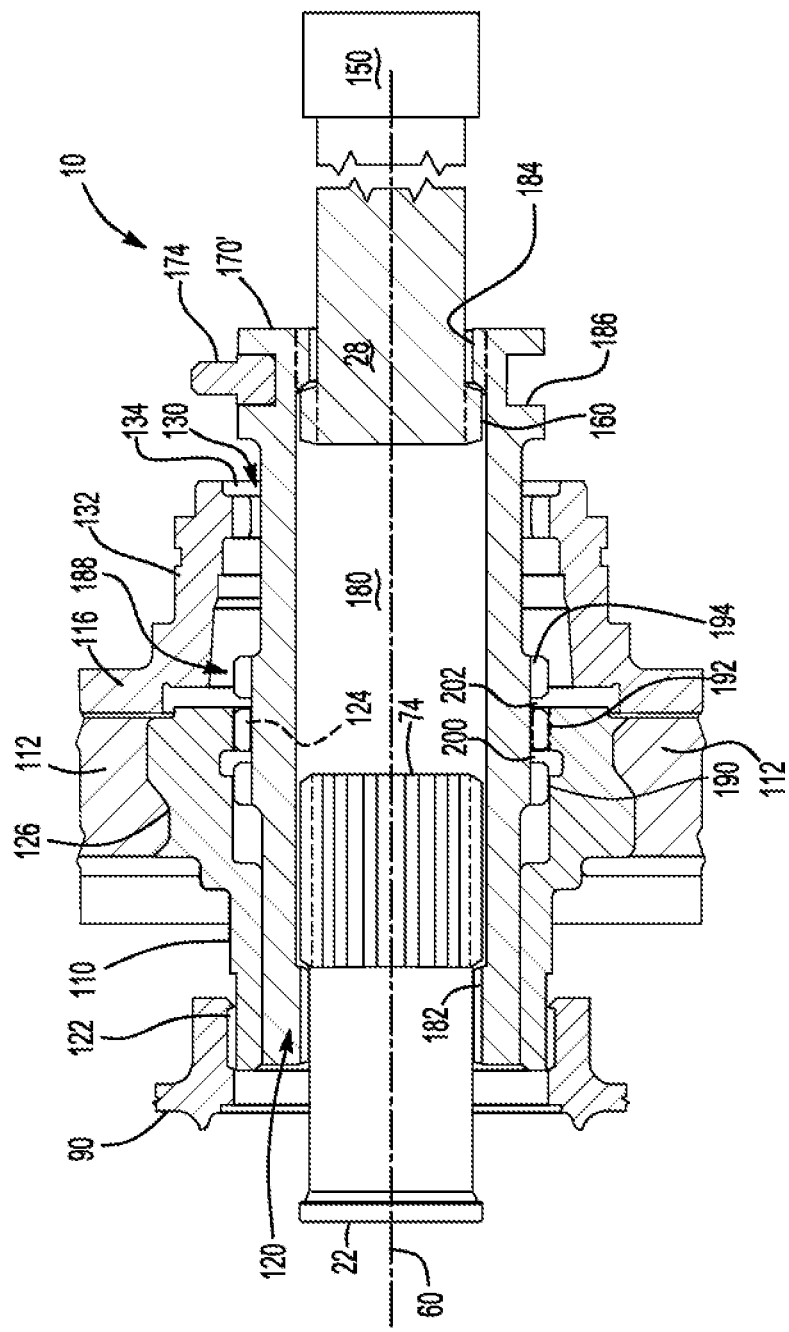

In FIG. 18, the shift collar 170' is shown in a second neutral position. The shift collar 170' may be coupled to the sun gear 110 such that the shift collar 170' and the sun gear 110 may be rotatable together about the first axis 60. For example, the second set of teeth 192 of the shift collar 170' may mate or mesh with the sun gear spline 122 of the sun gear 110. The shift collar 170' may be decoupled from the drive pinion 22 and may be decoupled from the auxiliary shaft 28 when the shift collar 170' is in the second neutral position. For instance, the first shift collar spline 182 may be spaced apart from and may not mate or mesh with the drive pinion spline 74 and the second shift collar spline 184 may be spaced apart from and may not mate or mesh with the auxiliary shaft spline 160 of the auxiliary shaft 28.

In FIG. 19, the shift collar 170' is shown in an auxiliary drive position. The shift collar 170' may couple the sun gear 110 of the gear reduction module 26 to the auxiliary shaft 28 such that the auxiliary shaft 28, the sun gear 110, and the shift collar 170' may be rotatable together about the first axis 60. For example, the third set of teeth 194 of the shift collar gear 188 may mate or mesh with the first gear portion 124 of the sun gear 110 and the second shift collar spline 184 may mate or mesh with the auxiliary shaft spline 160. The electric motor module 24 may provide torque to the sun gear 110 via the rotor shaft 90, and the sun gear 110 may provide torque to the auxiliary shaft 28 via the shift collar 170' when the shift collar 170' is in the auxiliary drive position and the electrical power source provides electrical power to the electric motor module 24. The shift collar 170' may be decoupled from the drive pinion 22 and the planet gear carrier 116 when the shift collar 170' is in the auxiliary drive position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drivetrain system comprising:
   an axle assembly that includes:
   an electric motor module;
   a gear reduction module that is operatively connected to the electric motor module;
   a drive pinion that is rotatable about a first axis;
   a differential assembly that is rotatable about a second axis and engages the drive pinion;
   an auxiliary shaft that is rotatable about the first axis and is spaced apart from the drive pinion; and
   a shift collar that is rotatable about the first axis with the auxiliary shaft and selectively couples the auxiliary shaft to the drive pinion, the gear reduction module, or the drive pinion and the gear reduction module.

2. The drivetrain system of claim 1 wherein the shift collar couples the drive pinion and the auxiliary shaft such that the drive pinion and the auxiliary shaft are rotatable together about the first axis and the shift collar is decoupled from the gear reduction module when the shift collar is in a first position.

3. The drivetrain system of claim 1 wherein the gear reduction module includes a planetary gear set that has a sun gear that is operatively connected to the electric motor module, a planetary ring gear, a planet gear that meshes with the sun gear and the planetary ring gear, and a planet gear carrier that rotatably supports the planet gear, and the shift collar couples the drive pinion, the auxiliary shaft, and the planet gear carrier such that the drive pinion, the auxiliary shaft, and the planet gear carrier are rotatable together about the first axis and the shift collar is decoupled from the sun gear when the shift collar is in a second position.

4. The drivetrain system of claim 3 wherein torque is provided from the electric motor module to the drive pinion and the auxiliary shaft via the gear reduction module and the shift collar when the shift collar is in the second position.

5. The drivetrain system of claim 3 wherein the shift collar couples the drive pinion, the auxiliary shaft, and the sun gear such that the drive pinion, the auxiliary shaft, and the sun gear are rotatable together about the first axis and the shift collar is decoupled from the planet gear carrier when the shift collar is in a third position.

6. The drivetrain system of claim 5 wherein torque is provided from the electric motor module to the drive pinion and the auxiliary shaft via the sun gear and the shift collar when the shift collar is in the third position.

7. The drivetrain system of claim 5 wherein the auxiliary shaft is operatively connected to an engine and torque is provided from the engine to the electric motor module and the drive pinion via the auxiliary shaft and the shift collar when the shift collar in in the second position and when the shift collar is in the third position.

8. The drivetrain system of claim 5 wherein the auxiliary shaft is operatively connected to an engine, torque is provided from the engine to the drive pinion via the auxiliary shaft and the shift collar, and torque is provided from the electric motor module to the drive pinion via the gear reduction module and the shift collar when the shift collar is in the second position and when the shift collar is in the third position.

9. The drivetrain system of claim 5 wherein the shift collar couples the auxiliary shaft and the sun gear such that the auxiliary shaft and the sun gear are rotatable together about the first axis and the shift collar does not couple the drive pinion to the gear reduction module when the shift collar is in a fourth position.

10. The drivetrain system of claim 9 wherein torque is provided from the electric motor module to the auxiliary shaft via the sun gear and the shift collar when the shift collar is in the fourth position.

11. The drivetrain system of claim 9 wherein the auxiliary shaft is operatively connected to an engine and torque is provided from the engine to the electric motor module when the shift collar is in the fourth position.

12. A drivetrain system comprising:
    an axle assembly that includes:
    an electric motor module;

a gear reduction module that is operatively connected to the electric motor module;

a drive pinion that is rotatable about a first axis;

a differential assembly that is rotatable about a second axis and engages the drive pinion;

an auxiliary shaft that is rotatable about the first axis and is spaced apart from the drive pinion; and a shift collar that is rotatable about the first axis and is configured to selectively couple the gear reduction module to the auxiliary shaft or the drive pinion.

13. The drivetrain system of claim 12 wherein the shift collar is coupled to the auxiliary shaft such that the shift collar is rotatable about the first axis with the drive pinion and the shift collar is decoupled from the gear reduction module and the auxiliary shaft when the shift collar is in a first neutral position.

14. The drivetrain system of claim 12 wherein the gear reduction module includes a planetary gear set that has a sun gear that is operatively connected to the electric motor module, a planetary ring gear, a planet gear that meshes with the sun gear and the planetary ring gear, and a planet gear carrier that rotatably supports the planet gear, and the shift collar couples the drive pinion to the planet gear carrier such that the drive pinion and the planet gear carrier are rotatable together about the first axis and the shift collar is decoupled from the auxiliary shaft and the sun gear when the shift collar is in a low range position.

15. The drivetrain system of claim 14 wherein the shift collar couples the drive pinion and the sun gear such that the drive pinion and the sun gear are rotatable together about the first axis and the shift collar is decoupled from the auxiliary shaft and the planet gear carrier when the shift collar is in a high range position.

16. The drivetrain system of claim 15 wherein the shift collar is coupled to the sun gear such that the shift collar is rotatable about the first axis with the sun gear and is decoupled from the drive pinion, the auxiliary shaft, and the planet gear carrier when the shift collar is in a second neutral position.

17. The drivetrain system of claim 16 wherein the shift collar couples the auxiliary shaft and the sun gear such that the auxiliary shaft and the sun gear are rotatable together about the first axis and the shift collar is decoupled from the drive pinion and the planet gear carrier when the shift collar is in an auxiliary drive position.

18. The drivetrain system of claim 17 wherein the sun gear has a first set of teeth, a second set of teeth, and a third set of teeth that are spaced apart from each other and extend away from the first axis, wherein the third set of teeth engages the planet gear carrier when the shift collar is in the low range position and the third set of teeth engages the sun gear when the shift collar is in the auxiliary drive position.

19. The drivetrain system of claim 18 wherein the first set of teeth engages the sun gear when the shift collar is in the high range position.

20. The drivetrain system of claim 19 wherein the second set of teeth engages the sun gear when the shift collar is in the second neutral position.

* * * * *